US011103939B2

(12) United States Patent
 Sollami

(10) Patent No.: US 11,103,939 B2
(45) Date of Patent: Aug. 31, 2021

(54) ROTATABLE BIT CARTRIDGE

(71) Applicant: The Sollami Company, Herrin, IL (US)

(72) Inventor: Phillip Sollami, Herrin, IL (US)

(73) Assignee: The Sollami Company, Herrin, IL (US)

(*) Notice: Subject to any disclaimer, the term of this patent is extended or adjusted under 35 U.S.C. 154(b) by 201 days.

(21) Appl. No.: 16/038,396

(22) Filed: Jul. 18, 2018

(65) Prior Publication Data
US 2020/0023447 A1 Jan. 23, 2020

(51) Int. Cl.
*B23C 5/22* (2006.01)
*E21C 35/18* (2006.01)
*E01C 23/088* (2006.01)

(52) U.S. Cl.
CPC .............. *B23C 5/22* (2013.01); *E01C 23/088* (2013.01); *B23C 2200/0416* (2013.01); *B23C 2200/083* (2013.01); *B23C 2200/367* (2013.01); *B23C 2210/161* (2013.01); *B23C 2222/28* (2013.01); *B23C 2222/84* (2013.01)

(58) Field of Classification Search
CPC ...... E01C 23/088; E21C 35/183; E21C 35/18; E21C 35/19; E21C 35/1837; E21C 35/1831; B23C 2200/0416; B23C 2200/083; B23C 2200/367; B23C 5/22; Y10T 407/12
See application file for complete search history.

(56) References Cited

U.S. PATENT DOCUMENTS

| 2,382,947 A | 7/1944 | Brozek |
| 2,551,167 A * | 5/1951 | Lucien .................... B23B 27/12 407/7 |
| 2,810,567 A | 10/1957 | Kirkham |
| 3,342,531 A | 9/1967 | Krekeler |
| 3,342,532 A | 9/1967 | Krekeler |
| 3,397,012 A | 8/1968 | Krekeler |
| 3,476,438 A | 11/1969 | Bower, Jr. |
| 3,519,309 A | 7/1970 | Engle |
| 3,833,264 A | 9/1974 | Elders |
| 3,833,265 A | 9/1974 | Elders |
| 3,865,437 A | 2/1975 | Crosby |
| 4,084,856 A | 4/1978 | Emmerich |

(Continued)

FOREIGN PATENT DOCUMENTS

| DE | 102004049710 | 4/2006 |
| DE | 102011079115 | 1/2013 |

(Continued)

*Primary Examiner* — Sara Addisu
(74) *Attorney, Agent, or Firm* — Mercedes V. O'Connor; Rockman Videbeck & O'Connor

(57) ABSTRACT

A rotatable bit cartridge that can be inserted and removed from permanently mounted cutter bodies, bit holders, and/or picks and are used until replacement of the cutter body, bit holder, and/or pick is required. The rotatable bit cartridge may include a forward end with a brazed diamond coated, layered, and/or diamond table bit tip insert or a brazed tungsten carbide bit tip insert. The rotatable bit includes a body that includes a generally cylindrical and/or a tapered first bore extending axially inwardly from a forward end of the body and a bit tip insert comprising a tip and a base subjacent the tip, a portion of the base adjacent a distal end of the bit tip insert disposed within the first bore of the body.

48 Claims, 25 Drawing Sheets

(56) References Cited

U.S. PATENT DOCUMENTS

| | | | |
|---|---|---|---|
| 4,223,580 A * | 9/1980 | Sidorenko | B23B 27/12 407/6 |
| 4,247,150 A | 1/1981 | Wrulich et al. | |
| RE30,807 E | 12/1981 | Elders | |
| 4,310,939 A | 1/1982 | Iijima | |
| 4,453,775 A | 6/1984 | Clemmow | |
| 4,478,298 A | 10/1984 | Hake | |
| 4,489,986 A | 12/1984 | Dziak | |
| 4,525,178 A | 6/1985 | Hall | |
| 4,561,698 A | 12/1985 | Beebe | |
| 4,570,726 A | 2/1986 | Hall | |
| 4,604,106 A | 8/1986 | Hall | |
| 4,632,463 A | 12/1986 | Sterwerf, Jr. | |
| 4,694,918 A | 9/1987 | Hall | |
| 4,702,525 A | 10/1987 | Sollami | |
| 4,763,956 A | 8/1988 | Emmerich | |
| 4,811,801 A | 3/1989 | Salesky | |
| 4,818,027 A | 4/1989 | Simon | |
| 4,821,819 A | 4/1989 | Whysong | |
| 4,844,550 A | 7/1989 | Beebe | |
| 4,893,967 A * | 1/1990 | Briese | B23C 5/22 407/101 |
| 4,915,455 A | 4/1990 | O'Niell | |
| 4,944,559 A | 7/1990 | Sionett | |
| 5,067,775 A | 11/1991 | D'Angelo | |
| 5,088,797 A | 2/1992 | O'Neill | |
| 5,098,167 A | 3/1992 | Latham | |
| 5,159,233 A | 10/1992 | Sponseller | |
| 5,161,627 A | 11/1992 | Burkett | |
| 5,273,343 A | 12/1993 | Ojanen | |
| 5,287,937 A | 2/1994 | Sollami | |
| 5,302,005 A | 4/1994 | O'Neill | |
| 5,303,984 A | 4/1994 | Ojanen | |
| 5,352,079 A | 10/1994 | Croskey | |
| 5,370,448 A | 12/1994 | Sterwerf, Jr. | |
| 5,374,111 A | 12/1994 | Den Besten | |
| 5,415,462 A | 5/1995 | Massa | |
| 5,417,475 A | 5/1995 | Graham et al. | |
| 5,458,210 A | 10/1995 | Sollami | |
| 5,484,191 A | 1/1996 | Sollami | |
| 5,492,188 A | 2/1996 | Smith et al. | |
| 5,551,760 A | 9/1996 | Sollami | |
| 5,607,206 A | 3/1997 | Siddle | |
| 5,628,549 A | 5/1997 | Ritchey | |
| 5,720,528 A | 2/1998 | Ritchey | |
| 5,725,283 A | 3/1998 | O'Neill | |
| 5,823,632 A | 10/1998 | Burkett | |
| 5,924,501 A | 7/1999 | Tibbitts | |
| 5,931,542 A | 8/1999 | Britzke | |
| 5,934,854 A | 8/1999 | Krautkremer et al. | |
| 5,992,405 A | 11/1999 | Sollami | |
| D420,013 S | 2/2000 | Warren | |
| 6,019,434 A | 2/2000 | Emmerich | |
| 6,102,486 A | 8/2000 | Briese | |
| 6,176,552 B1 | 1/2001 | Topka, Jr. | |
| 6,196,340 B1 | 3/2001 | Jensen et al. | |
| 6,199,451 B1 | 3/2001 | Sollami | |
| 6,250,535 B1 | 6/2001 | Sollami | |
| 6,331,035 B1 | 12/2001 | Montgomery, Jr. | |
| 6,341,823 B1 | 1/2002 | Sollami | |
| 6,354,771 B1 * | 3/2002 | Bauschulte | E21C 35/183 407/114 |
| 6,357,832 B1 | 3/2002 | Sollami | |
| 6,371,567 B1 | 4/2002 | Sollami | |
| 6,382,733 B1 | 5/2002 | Parrott | |
| 6,428,110 B1 | 8/2002 | Ritchey et al. | |
| 6,508,516 B1 | 1/2003 | Kammerer | |
| D471,211 S | 3/2003 | Sollami | |
| 6,585,326 B2 | 7/2003 | Sollami | |
| 6,592,304 B1 * | 7/2003 | Kammerer | E21C 35/183 407/119 |
| 6,601,620 B1 * | 8/2003 | Monyak | A01G 23/067 144/24.12 |
| 6,685,273 B1 | 2/2004 | Sollami | |
| 6,692,083 B2 | 2/2004 | Latham | |
| D488,170 S | 4/2004 | Sollami | |
| 6,733,087 B2 | 5/2004 | Hall | |
| 6,739,327 B2 | 5/2004 | Sollami | |
| 6,758,530 B2 * | 7/2004 | Sollami | B28D 1/188 299/104 |
| 6,786,557 B2 | 9/2004 | Montgomery | |
| 6,824,225 B2 | 11/2004 | Stiffer | |
| 6,846,045 B2 * | 1/2005 | Sollami | B28D 1/188 299/105 |
| 6,854,810 B2 | 2/2005 | Montgomery | |
| 6,866,343 B2 | 3/2005 | Holl et al. | |
| 6,968,912 B2 | 11/2005 | Sollami | |
| 6,994,404 B1 | 2/2006 | Sollami | |
| 7,097,258 B2 | 8/2006 | Sollami | |
| 7,118,181 B2 | 10/2006 | Frear | |
| 7,150,505 B2 | 12/2006 | Sollami | |
| 7,195,321 B1 | 3/2007 | Sollami | |
| 7,210,744 B2 | 5/2007 | Montgomery | |
| 7,229,136 B2 | 6/2007 | Sollami | |
| 7,234,782 B2 | 6/2007 | Stehney | |
| D554,162 S | 10/2007 | Hall | |
| 7,320,505 B1 | 1/2008 | Hall | |
| 7,338,135 B1 | 3/2008 | Hall | |
| 7,347,292 B1 | 3/2008 | Hall | |
| D566,137 S | 4/2008 | Hall | |
| 7,353,893 B1 | 4/2008 | Hall | |
| 7,384,105 B2 | 6/2008 | Hall | |
| 7,396,086 B1 * | 7/2008 | Hall | E21C 35/183 299/113 |
| 7,401,862 B2 | 7/2008 | Holl et al. | |
| 7,401,863 B1 | 7/2008 | Hall | |
| 7,410,221 B2 | 8/2008 | Hall | |
| 7,413,256 B2 | 8/2008 | Hall | |
| 7,413,258 B2 | 8/2008 | Hall | |
| 7,419,224 B2 | 9/2008 | Hall | |
| 7,445,294 B2 | 11/2008 | Hall | |
| D581,952 S | 12/2008 | Hall | |
| 7,464,993 B2 | 12/2008 | Hall | |
| 7,469,756 B2 | 12/2008 | Hall | |
| 7,469,971 B2 | 12/2008 | Hall | |
| 7,469,972 B2 | 12/2008 | Hall | |
| 7,475,948 B2 | 1/2009 | Hall | |
| 7,523,794 B2 | 4/2009 | Hall | |
| 7,568,770 B2 | 8/2009 | Hall | |
| 7,569,249 B2 | 8/2009 | Hall | |
| 7,571,782 B2 | 8/2009 | Hall | |
| 7,575,425 B2 | 8/2009 | Hall | |
| 7,588,102 B2 | 9/2009 | Hall | |
| 7,594,703 B2 | 9/2009 | Hall | |
| 7,600,544 B1 | 10/2009 | Sollami | |
| 7,600,823 B2 * | 10/2009 | Hall | E21C 35/183 299/106 |
| 7,628,233 B1 | 12/2009 | Hall | |
| 7,635,168 B2 | 12/2009 | Hall | |
| 7,637,574 B2 | 12/2009 | Hall | |
| 7,648,210 B2 | 1/2010 | Hall | |
| 7,665,552 B2 | 2/2010 | Hall | |
| 7,669,938 B2 * | 3/2010 | Hall | E21C 35/183 299/111 |
| 7,681,338 B2 | 3/2010 | Hall | |
| 7,712,693 B2 | 5/2010 | Hall | |
| 7,717,365 B2 * | 5/2010 | Hall | E21B 10/16 241/194 |
| 7,722,127 B2 | 5/2010 | Hall | |
| 7,789,468 B2 | 9/2010 | Sollami | |
| 7,832,808 B2 | 11/2010 | Hall | |
| 7,883,155 B2 | 2/2011 | Sollami | |
| 7,950,745 B2 | 5/2011 | Sollami | |
| 7,963,617 B2 | 6/2011 | Hall | |
| 7,992,944 B2 | 8/2011 | Hall | |
| 7,992,945 B2 | 8/2011 | Hall | |
| 7,997,660 B2 | 8/2011 | Monyak et al. | |
| 7,997,661 B2 | 8/2011 | Hall | |
| 8,007,049 B2 | 8/2011 | Fader | |
| 8,007,051 B2 | 8/2011 | Hall | |
| 8,029,068 B2 | 10/2011 | Hall | |
| 8,033,615 B2 * | 10/2011 | Hall | E21C 35/18 299/113 |

(56) References Cited

U.S. PATENT DOCUMENTS

| | | | |
|---|---|---|---|
| 8,033,616 B2 | 10/2011 | Hall | |
| 8,038,223 B2 | 10/2011 | Hall | |
| 8,061,784 B2 | 11/2011 | Hall | |
| 8,109,349 B2 | 2/2012 | Hall | |
| 8,118,371 B2 | 2/2012 | Hall | |
| 8,136,887 B2 | 3/2012 | Hall | |
| 8,201,892 B2 | 6/2012 | Hall | |
| 8,215,420 B2 | 7/2012 | Hall | |
| 8,292,372 B2 | 10/2012 | Hall | |
| 8,414,085 B2 | 4/2013 | Hall | |
| 8,449,039 B2 | 5/2013 | Hall | |
| 8,485,609 B2 | 7/2013 | Hall | |
| 8,500,209 B2 | 8/2013 | Hall | |
| 8,540,320 B2 | 9/2013 | Sollami | |
| RE44,690 E | 1/2014 | Sollami | |
| 8,622,482 B2 | 1/2014 | Sollami | |
| 8,622,483 B2 | 1/2014 | Sollami | |
| 8,646,848 B2 | 2/2014 | Hall | |
| 8,728,382 B2 | 5/2014 | Hall | |
| 8,740,314 B2 | 6/2014 | O'Neill | |
| 8,783,785 B2* | 7/2014 | Lehnert | E21C 35/183 299/105 |
| 9,004,610 B2 | 4/2015 | Erdmann et al. | |
| 9,028,008 B1 | 5/2015 | Bookhamer | |
| 9,039,099 B2* | 5/2015 | Sollami | B28D 1/188 299/79.1 |
| 9,316,061 B2 | 4/2016 | Hall | |
| 9,518,464 B2 | 12/2016 | Sollami | |
| 9,879,531 B2 | 1/2018 | Sollami | |
| 9,909,416 B1 | 3/2018 | Sollami | |
| 9,976,418 B2 | 5/2018 | Sollami | |
| 9,988,903 B2 | 6/2018 | Sollami | |
| 10,072,501 B2 | 9/2018 | Sollami | |
| 10,105,870 B1 | 10/2018 | Sollami | |
| 10,107,097 B1 | 10/2018 | Sollami | |
| 10,107,098 B2 | 10/2018 | Sollami | |
| 10,180,065 B1 | 1/2019 | Sollami | |
| 10,260,342 B1 | 4/2019 | Sollami | |
| 10,323,515 B1 | 6/2019 | Sollami | |
| 10,337,324 B2 | 7/2019 | Sollami | |
| 10,370,966 B1 | 8/2019 | Sollami | |
| 10,385,689 B1 | 8/2019 | Sollami | |
| 10,415,386 B1 | 9/2019 | Sollami | |
| 10,502,056 B2 | 12/2019 | Sollami | |
| 10,767,478 B2* | 9/2020 | Sollami | E21C 35/197 |
| 2002/0063467 A1 | 5/2002 | Taitt | |
| 2002/0074850 A1 | 6/2002 | Montgomery, Jr. | |
| 2002/0074851 A1 | 6/2002 | Montgomery, Jr. | |
| 2002/0109395 A1 | 8/2002 | Sollami | |
| 2002/0167216 A1* | 11/2002 | Sollami | E21C 35/197 299/106 |
| 2002/0192025 A1 | 12/2002 | Johnson | |
| 2003/0015907 A1 | 1/2003 | Sollami | |
| 2003/0047985 A1 | 3/2003 | Stiffler | |
| 2003/0052530 A1 | 3/2003 | Sollami | |
| 2003/0122414 A1 | 7/2003 | Sollami | |
| 2003/0209366 A1 | 11/2003 | McAlvain | |
| 2003/0210963 A1* | 11/2003 | Kakai | B23B 31/008 408/231 |
| 2004/0004389 A1 | 1/2004 | Latham | |
| 2004/0174065 A1 | 9/2004 | Sollami | |
| 2005/0212345 A1 | 9/2005 | Sleep et al. | |
| 2006/0071538 A1 | 4/2006 | Sollami | |
| 2006/0186724 A1 | 8/2006 | Stehney | |
| 2006/0261663 A1 | 11/2006 | Sollami | |
| 2007/0013224 A1 | 1/2007 | Stehney | |
| 2007/0040442 A1 | 2/2007 | Weaver | |
| 2007/0052279 A1 | 3/2007 | Sollami | |
| 2008/0035386 A1* | 2/2008 | Hall | E21C 35/19 175/425 |
| 2008/0036276 A1 | 2/2008 | Hall et al. | |
| 2008/0036283 A1 | 2/2008 | Hall et al. | |
| 2008/0100124 A1 | 5/2008 | Hall et al. | |
| 2008/0145686 A1 | 6/2008 | Mirchandani | |
| 2008/0164747 A1 | 7/2008 | Weaver et al. | |
| 2008/0284234 A1 | 11/2008 | Hall et al. | |
| 2009/0146491 A1 | 6/2009 | Fader et al. | |
| 2009/0160238 A1 | 6/2009 | Hall et al. | |
| 2009/0256413 A1 | 10/2009 | Majagi | |
| 2009/0261646 A1 | 10/2009 | Ritchie et al. | |
| 2010/0045094 A1 | 2/2010 | Sollami | |
| 2010/0244545 A1 | 9/2010 | Hall | |
| 2010/0253130 A1* | 10/2010 | Sollami | E21C 35/197 299/113 |
| 2010/0320003 A1 | 12/2010 | Sollami | |
| 2010/0320829 A1 | 12/2010 | Sollami | |
| 2011/0006588 A1 | 1/2011 | Monyak et al. | |
| 2011/0089747 A1* | 4/2011 | Helsel | E21C 35/18 299/104 |
| 2011/0175430 A1 | 7/2011 | Heiderich et al. | |
| 2011/0204703 A1 | 8/2011 | Sollami | |
| 2011/0254350 A1* | 10/2011 | Hall | E21C 35/183 299/113 |
| 2012/0001475 A1 | 1/2012 | Dubay et al. | |
| 2012/0027514 A1 | 2/2012 | Hall | |
| 2012/0056465 A1 | 3/2012 | Gerer et al. | |
| 2012/0068527 A1* | 3/2012 | Erdmann | B28D 1/188 299/106 |
| 2012/0104830 A1 | 5/2012 | Monyak et al. | |
| 2012/0181845 A1 | 7/2012 | Sollami | |
| 2012/0242136 A1 | 9/2012 | Ojanen | |
| 2012/0248663 A1 | 10/2012 | Hall | |
| 2012/0261977 A1 | 10/2012 | Hall | |
| 2012/0280559 A1* | 11/2012 | Watson | E21C 35/18 299/106 |
| 2012/0286559 A1 | 11/2012 | Sollami | |
| 2012/0319454 A1* | 12/2012 | Swope | E21C 35/197 299/104 |
| 2013/0169023 A1 | 7/2013 | Monyak | |
| 2013/0181501 A1 | 7/2013 | Hall et al. | |
| 2013/0199693 A1 | 8/2013 | Tank et al. | |
| 2013/0307316 A1 | 11/2013 | Roetsch et al. | |
| 2014/0035346 A1 | 2/2014 | Fundakowski et al. | |
| 2014/0110991 A1 | 4/2014 | Sollami | |
| 2014/0232172 A1 | 8/2014 | Roth et al. | |
| 2014/0262541 A1 | 9/2014 | Parsana et al. | |
| 2014/0326516 A1 | 11/2014 | Haugvaldstad | |
| 2015/0028656 A1 | 1/2015 | Sollami | |
| 2015/0035343 A1 | 2/2015 | Ojanen | |
| 2015/0137579 A1 | 5/2015 | Lachmann et al. | |
| 2015/0198040 A1 | 7/2015 | Voitic et al. | |
| 2015/0240634 A1 | 8/2015 | Sollami | |
| 2015/0285074 A1* | 10/2015 | Sollami | E21C 35/183 299/39.4 |
| 2015/0292325 A1 | 10/2015 | Sollami | |
| 2015/0300166 A1 | 10/2015 | Ries et al. | |
| 2015/0308488 A1 | 10/2015 | Kahl | |
| 2015/0315910 A1* | 11/2015 | Sollami | E21C 35/19 299/105 |
| 2015/0354285 A1 | 12/2015 | Hall | |
| 2016/0102550 A1 | 4/2016 | Paros et al. | |
| 2016/0194956 A1 | 7/2016 | Sollami | |
| 2016/0229084 A1 | 8/2016 | Lehnert | |
| 2016/0237818 A1 | 8/2016 | Weber et al. | |
| 2017/0089198 A1 | 3/2017 | Sollami | |
| 2017/0101867 A1* | 4/2017 | Hall | E21C 35/1933 |

FOREIGN PATENT DOCUMENTS

| | | |
|---|---|---|
| DE | 202012100353 | 6/2013 |
| DE | 102015121953 | 7/2016 |
| DE | 102016118658 | 3/2017 |
| EP | 3214261 | 9/2017 |
| GB | 1114156 | 5/1968 |
| GB | 1218308 | 1/1971 |
| GB | 2483157 | 2/2012 |
| GB | 2534370 | 7/2016 |
| WO | 2008105915 A2 | 9/2008 |
| WO | 2008105915 A3 | 9/2008 |
| WO | 2009006612 | 1/2009 |

* cited by examiner

ROTATABLE BIT CARTRIDGE

TECHNICAL FIELD

This disclosure relates to a cutter body and/or bit holder and, more particularly, to a cutter body and/or bit holder utilizing a rotatable bit cartridge.

BACKGROUND

Road mining, trenching, and milling equipment utilizes bits and/or picks traditionally set in a bit assembly. Bit assemblies can include a bit and/or pick retained by a cutter body and/or bit holder, where the cutter body and/or bit holder permanently mounted within a bore in a bit holder block, hereinafter referred to as a base block. A plurality of the bit assemblies are mounted on an outside surface of a rotatable, cylindrical drum, typically in a herringbone, V-shape, or spiral configuration. A plurality of the bit assemblies can also be mounted on an endless chain and plate configuration or on an outer surface of a continuous chain. The combinations of bit assemblies have been utilized to remove material from the terra firma, such as degrading the surface of the earth, minerals, cement, concrete, macadam or asphalt pavement. Individual bits and/or picks, cutter bodies, bit holders, and base blocks may wear down or break over time due to the harsh road degrading environment. To prolong the life of the bit assembly, rotatable bit cartridges that can be inserted and removed from permanently mounted cutter bodies and/or bit holders are used until replacement of the cutter body and/or bit holder is required. To further prolong the life of the rotatable bit cartridge, the rotatable bit cartridge may include a forward end with a brazed diamond coated and/or layered bit tip insert or a brazed tungsten carbide bit tip insert.

SUMMARY

This disclosure relates generally to unitary bit/bit holder combinations and/or pick assemblies for road milling, mining, and trenching equipment. One implementation of the teachings herein is a rotatable bit that includes a body comprising a one of a generally cylindrical and a tapered first bore extending axially inwardly from a forward end of the body; and a bit tip insert comprising a tip and a base subjacent the tip, a portion of the base adjacent a distal end of the bit tip insert disposed within the first bore of the body.

These and other aspects of the present disclosure are disclosed in the following detailed description of the embodiments, the appended claims and the accompanying figures.

BRIEF DESCRIPTION OF THE DRAWINGS

The features of the present disclosure which are believed to be novel are set forth with particularity in the appended claims. The disclosure may best be understood from the following detailed description of currently illustrated embodiments thereof taken in conjunction with the accompanying drawings wherein like numerals refer to like parts, and in which:

DETAILED DESCRIPTION

Road mining, trenching, and milling equipment utilizes bits and/or picks traditionally set in a bit assembly. Bit assemblies can include a bit and/or pick retained by a cutter body and/or bit holder, where the cutter body and/or bit holder permanently mounted within a bore in a bit holder block, hereinafter referred to as a base block. A plurality of the bit assemblies are mounted on an outside surface of a rotatable, cylindrical drum, typically in a herringbone, V-shape, or spiral configuration. A plurality of the bit assemblies can also be mounted on an endless chain and plate configuration or on an outer surface of a continuous chain. The combinations of bit assemblies have been utilized to remove material from the terra firma, such as degrading the surface of the earth, minerals, cement, concrete, macadam or asphalt pavement. Individual bits and/or picks, cutter bodies, bit holders, and base blocks may wear down or break over time due to the harsh road degrading environment.

To prolong the life of the bit assembly, rotatable bit cartridges that can be inserted and removed from permanently mounted cutter bodies and/or bit holders and can be used until replacement of the cutter body and/or bit holder is required. The rotatable bit cartridge is rotatable throughout within the cutter bodies and/or unitary bit/holders after insertion into the bit holder. The rotatable bit cartridge may or may not rotate when engaged into the surface being eroded by the rotatable bit cartridge. Eventually, material and/or fines will prevent rotation except intermittently, which will gradually diminish the rotation of the rotatable bit cartridge. However, rotation of the rotatable bit cartridge can be restored by removing the rotatable bit cartridge and cleaning the bit cartridge bore, as well as cleaning the rotatable bit cartridge itself. Reinstalling the rotatable bit cartridge after cleaning will again allow improved bit cartridge rotation.

The rotatable bit cartridge can also be designed to not provide continuous rotational capabilities, but provide an occasional manual rotational design feature. The non-continuous rotation design allows the bit body to be reused with only the rotatable bit cartridge changed out as needed.

To further prolong the life of the rotatable bit cartridge, the rotatable bit cartridge may include a forward end with a brazed diamond coated and/or layered bit tip insert or a brazed tungsten carbide bit tip insert. The diamond coated and/or layered bit tip inserts may include an overlay of a polycrystalline diamond structure, such as an industrial diamond material, natural diamond, polycrystalline diamond (PCD) material, and polycrystalline diamond composite and/or PCD material, which has been shown to increase the in-service life of the bit tip insert.

Figure 5:
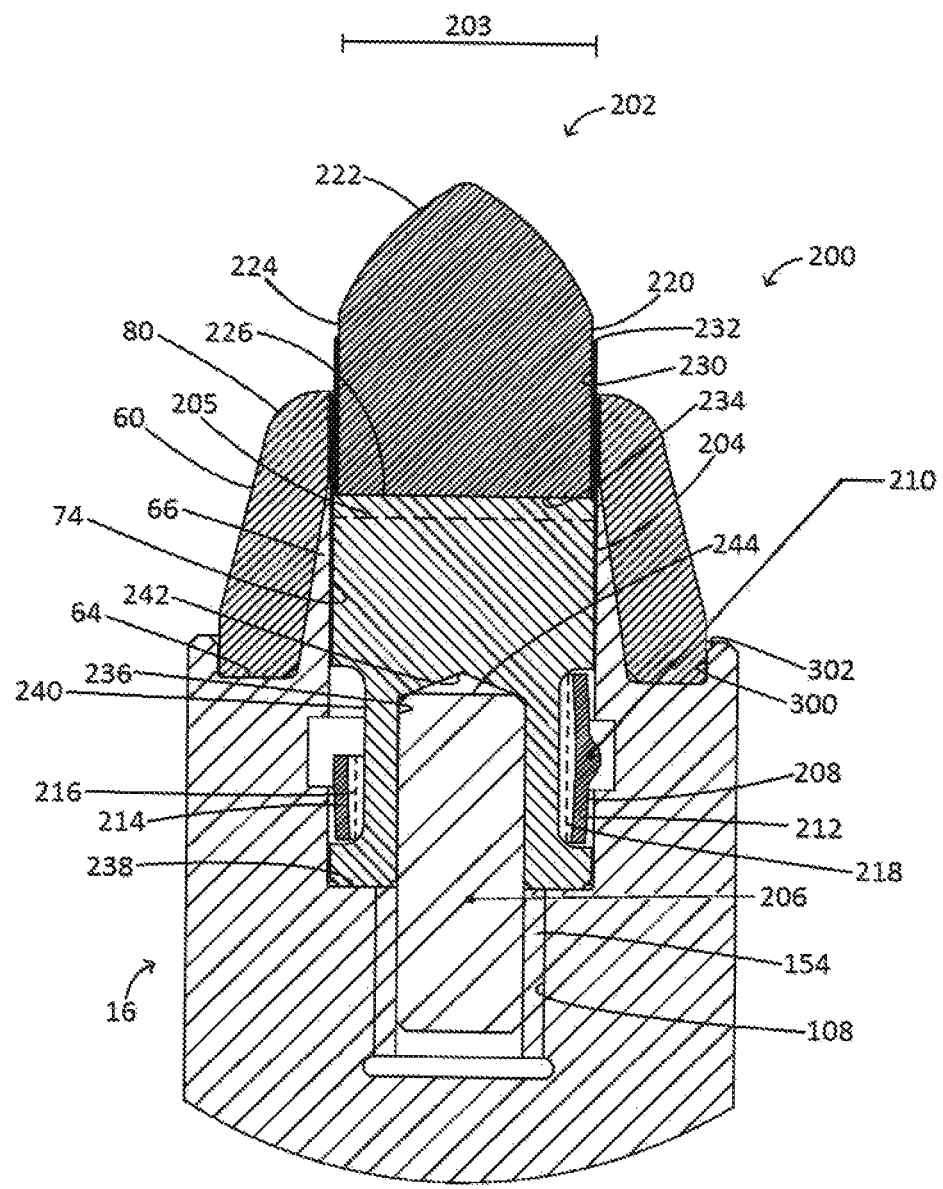
FIG. 5 is a detail cross-sectional view of the first embodiment of the unitary bit/holder and a third embodiment of a rotatable bit cartridge assembled in the unitary bit/holder in accordance with implementations of this disclosure.
Figure 6:
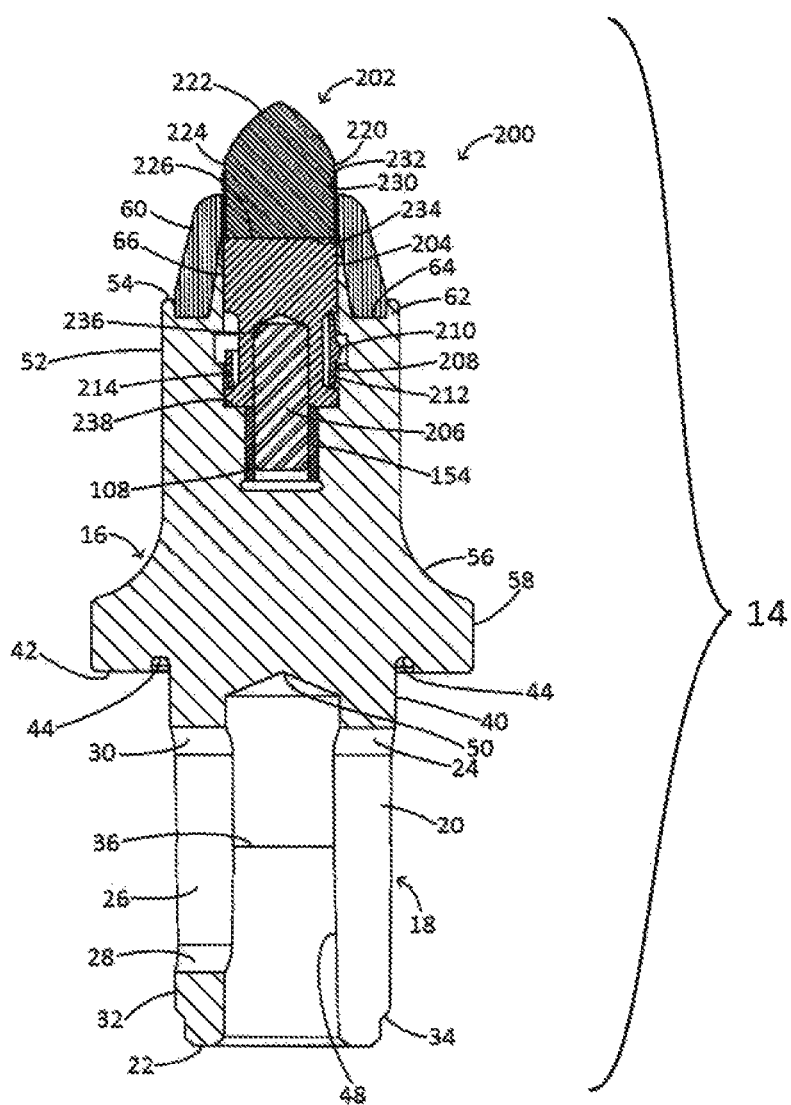
FIG. 6 is a cross-sectional view of the first embodiment of the unitary bit/holder and the third embodiment of the rotatable bit cartridge assembled in the unitary bit/holder in accordance with implementations of this disclosure.
Figure 7A:
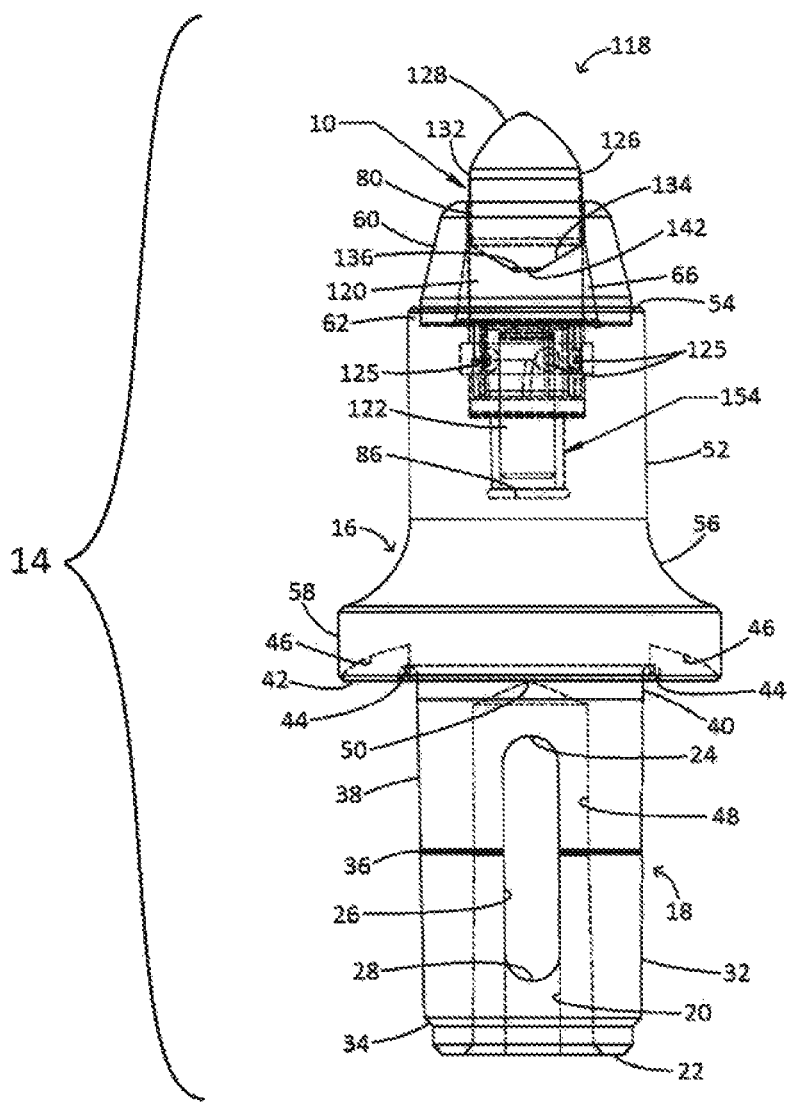
FIG. 7A is a side elevation view of the first embodiment of the unitary bit/holder and the first embodiment of the rotatable bit cartridge assembled with the unitary bit/holder, showing invisible internal elements in dotted lines, in accordance with implementations of this disclosure.

A first embodiment of a rotatable bit cartridge 10, shown in FIGS. 1-3, 7A, 7B, 8A, and 13, and a first embodiment of a bit holder, tool, and/or pick 12, shown in FIGS. 1-3, 5-7A, 19, and 24, of the present disclosure form a unitary structure bit and bit holder construction of a bit/holder and/or pick 14 (FIG. 7A). The first embodiment of the bit holder 12 comprises a body 16 and a generally cylindrical hollow shank 18 depending from a bottom of the body 16. The shank 18 includes an elongate first slot 20 extending from a generally annular distal end 22 of the shank 18 axially upward or forward to an upper termination 24 adjacent the upper or forward end of the shank 18. In this illustrated embodiment, the shank 18 also includes an internally oriented second slot 26 located approximately 180 degrees around the annular shank 18 from the first slot 20. The second slot 26 is parallel to the first slot 20 and is an internal slot including a rearward semicircular termination 28 inwardly adjacent the distal end 22 of the shank 18 and a forward semicircular termination 30 (FIG. 6) generally coinciding longitudinally and axially with the upper termination 24 of the first slot 20.

In this first embodiment of the bit holder 12, the shank 18 includes a lower or first tapered portion 32 running axially from a stepped shoulder 34 adjacent the distal end 22 of the shank 18. The stepped shoulder 34 is disposed between the lower tapered portion 32 and the distal end 22. A diameter of the stepped shoulder 34 increases, or steps up, in this embodiment, as it axially extends from the distal end 22 to the lower tapered portion 32. The first tapered portion 32 runs upwardly or axially from the stepped shoulder 34 of the shank 18 and terminates generally mid first slot 20 longitudinally. The shank 18 also includes an annular shoulder 36 separating the lower tapered portion 32 from an upper or second tapered portion 38 which extends from the shoulder 36 to generally adjacent to the top of the shank 18 or forward terminations 24, 30 of slots 20, 26, respectively. The annular shoulder 36 is disposed between the lower tapered portion 32 and the upper tapered portion 38. A diameter of the annular shoulder 36 decreases, or steps down, in this embodiment, as it axially extends from the lower tapered portion 32 to the upper tapered portion 38. In other embodiments, the lower portion 32 and/or the upper portion 36 of the shank 18 may comprise a generally cylindrical shape, a slight draw angle, or a slight draft angle.

A generally cylindrical top portion 40 of the shank 18 extends from a position adjacent the top or upper terminations 24, 30 of slots 20, 26, respectively, towards a generally annular back flange 42 that denotes the base or the bottom of the body 16 of the bit holder 12. The top of the shank 18 may include a rounded junction 44 between the top portion 40 of the shank 18 and the generally annular flange 42 of the body 16 of the bit holder 12, which is provided to avoid sharp corners which may provide an area for stress cracks to begin. The generally annular flange 42 includes a pair of horizontal slots 46-46 generally perpendicular to the longitudinal axis of the combination bit/holder, one on either side of the generally annular flange 42. The horizontal slots 46-46 are configured to receive a pair of bifurcated fork tines that may be inserted between the base of the body 16 of the bit holder 12 and a base block (not shown) into which the shank 18 of the unitary bit/holder 14 is inserted and retained by outward radial force in use.

A central bore 48 longitudinally and axially extending through the shank 18 of the bit holder 12 terminates at bore termination 50, which in this illustrated embodiment has a conical shape, which is approximately at the upper end of the shank 18. This allows the generally C-shaped annular sidewall of the shank 18 to radially contract when the shank 18 is mounted in a tapered and/or cylindrical bore in a base block (not shown).

In this first illustrated embodiment of the bit holder 12, the bit holder body 16 includes a generally cylindrical or annular upper body portion 52 depending from a forward end 54 of the upper body portion 52. A mediate body portion 56 subjacent the upper body portion 52 generally slopes axially and radially outwardly to a radially extending generally cylindrical tire portion 58.

Figure 24:
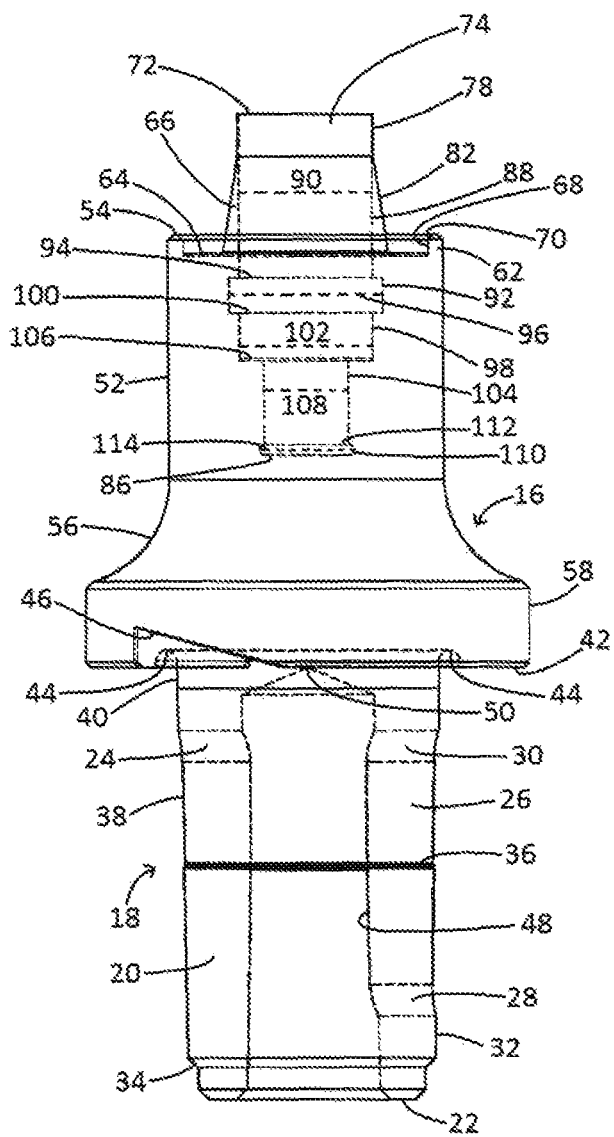
FIG. 24 is a side elevation view of the first embodiment of the unitary bit/holder of FIGS. 1-3, 5, 6, 7A, and 19, showing invisible internal elements in dotted lines, in accordance with implementations of this disclosure.

The bit holder body 16, in order to provide superior brazing of a tungsten carbide ring 60 to the forward end 54 of the upper body portion 52, includes a forwardly extending annular collar 62 that is created on the bit holder body 16 to provide an annular trough 64 around a forward extension 66 of the bit holder body 16 onto which the annular ring 60 is mounted. In this illustrated embodiment, the annular collar 62 includes a cylindrical bottom inner wall 68 (FIG. 24) and a tapered top inner wall or countersink 70 (FIG. 24). The vertical outer wall of the collar 62 will keep brazing material from flowing outwardly of the joinder between the base of the ring 60 and the annular trough 64 on which the ring 60 is positioned. The annular trough 64 is therearound positioned perpendicular to the axis of the bit holder 12 from the interior of which axially extends the smaller radially oriented annular upper or forward extension 66. Around this tapered forward extension 66 is fitted the annular tungsten carbide ring 60, the forward extension 66 extending through a bore 76 that extends through the annular tungsten carbide ring 60 allowing a bottom of the ring 60 to be seated in the annular trough 64, which may be brazed into unitary construction with the remainder of the bit holder 12. The bit holder 12 may be machined and hardened, or hardened and then machined, or machined and then hardened. The annular tungsten carbide ring 60 may be brazed before or after hardening of the bit holder 12.

In this exemplary implementation of the first embodiment of the bit holder 12, the forward extension 66 includes a generally cylindrical top portion 78 that is complementary shaped to a generally cylindrical top inner portion 80 of the bore 76 of the ring 60 and an outwardly tapered bottom portion 82 that is complementary shaped to an outwardly tapered bottom inner portion 84 of the bore 76 of the ring 60. An axial length 116 of the ring 60, corresponding to the generally cylindrical top inner portion 80 of the bore 76 of the ring 60, is adapted to maintain radial support. In other implementations, the forward extension 66 and the bore 76 of the ring 60 can have other complementary shaped surfaces. The top or forwardmost portion of the tungsten carbide ring 60 and the annular tapered forward extension 66 of the bit holder body 16 terminate generally at a forward end 72 of the bit holder body 16 of the bit holder 12.

With the bit holder body 16 of the present disclosure in this embodiment made of 4340 or equivalent steel, whether direct hardened or carburized and hardened, the top of the forward extension 66 of the bit holder body 16 includes a generally cylindrical bore 74 extending from the co-terminal upper wall of the body axially inwardly thereof. In other embodiments, the bore 74 can also have a tapered bore or a slight draw or draft angle. The bore 74 extends from the forward end 72 of the bit holder body 16 to a bore termination 86 within the upper body portion 52 adjacent the mediate body portion 56 of the bit holder body 16. The bore 74 comprises a plurality of bore sections that may be generally cylindrical, tapered, and/or arcuate and that include various diameters as it extends from the forward end 72 to the bore termination 86. A generally cylindrical first bore section 88 of the bore 74, which axially extends from the forward end 72 of the bit holder body 16 to a location adjacent the annular trough 64, has a first diameter 90. A generally cylindrical second bore section 92 of the bore 74, which axially extends from a distal end 94 of the first bore section 88, has a second diameter 96 that is greater than the first diameter 90. A generally cylindrical third bore section 98 of the bore 74, which axially extends from a distal end 100 of the second bore section 92, has a third diameter 102 that is approximately the first diameter 90 of the first bore section 88. A generally cylindrical fourth bore section 104 of the bore 74, which axially extends from a distal end 106 of the third bore section 98, has a fourth diameter 108 that is less than the first diameter 90, the second diameter 96, and the third diameter 102. A fifth bore section 110, which axially extends from a distal end 112 of the fourth bore section 104 to the bore termination 86, has a fifth diameter 114 that is greater than the fourth diameter 108 and less than the first diameter 90, the second diameter 96, and the third diameter 102. In this exemplary implementation of the first embodiment, the fifth bore section 110 has arcuate sidewalls.

The bore 74 provides a space for receiving the complementary shaped first embodiment of the rotatable bit cartridge 10. The rotatable bit cartridge 10 comprises a generally conical bit tip insert 118, a tungsten carbide or steel member 120, a tungsten carbide or hardened steel pin 122, and a dimpled wedding band style retainer 124 that includes at least one dimple 125 on the outer surface of the retainer 124. The bit tip insert 118 comprises a base 126 and a tip 128 adjacent the base 126 that includes a parabolic curved section below an apex of the bit tip insert 118. The base 126 and/or the distal end may also be planar in an alternate embodiment. This tip 128 can have a frustoconical shape, a flat generally cylindrical puck shape, a parabolic ballistic shape, a conical shape, and/or an arcuate shape. In this first embodiment, the base 126 includes a generally cylindrical sidewall 132 and a frustoconical portion 134 adjacent a distal end 136 of the bit tip insert 118. In alternate embodiments, the base 126 can include a tapered sidewall (shown in dotted lines in FIG. 1) and the frustoconical portion 134 adjacent the distal end 136 of the bit tip insert 118, the base 126 can include a generally cylindrical sidewall 132 and a planar distal end (not shown) without a frustoconical portion, and the base 126 can include a tapered sidewall (shown in dotted lines in FIG. 1) and a planar distal end (not shown) without a frustoconical portion. In one exemplary implementation of the first embodiment, the bit tip insert 118 can have a diameter in the range of ⅝ inch to 1¼ inches. The bit tip insert 118 may be a tungsten carbide insert or may be a tungsten carbide insert that includes an overlay 130 (not shown) of a polycrystalline diamond structure that is applied to an outer surface of the tip 128. The overlay 130 may be a single coating or outer layer or multiple coatings or outer layers of such industrial diamond material, natural diamond, polycrystalline diamond (PCD) material, and polycrystalline diamond composite or PCD material.

The member 120 comprises an outer diameter 121 that is approximately 0.030 inch, in this exemplary implementation, larger than an upper outer diameter 119 of the bit tip insert 118 and comprises a generally cylindrical first bore 138 that axially extends inwardly from a forward end 140 of the member 120 to a first bore termination 142, which provides a space for receiving the complementary shaped sidewall 132 and planar or frustoconical portion 134 of the base 126 of the bit tip insert 118. The diameter 121 of the member 120 may be machined to a finished size before or after the bit tip insert 118 is brazed into the first bore 138 of the member 120. The remaining wall of the member 120 adjacent the inner portion 80 of the tungsten carbide ring 60 will wear away in use, causing the top portion of the sidewall 132 of the tungsten carbide base 126 of the bit tip insert 118 to contact and be supported by the dowel pin 122 and the generally cylindrical or tapered (not shown) top inner portion 80 of the tungsten carbide ring 60.

The member 120 further comprises a generally cylindrical second bore 148 that axially extends inwardly from a distal end 146 of the member 120 through an annular groove 144 of the member 120 adjacent the distal end 146 of the member 120 to a second bore termination 150, which in this embodiment, has a conical shape. The second bore 148 provides a space for receiving a forward end 152 of the dowel pin 122. The annular groove 144 of the member 120 includes a smaller diameter than the rest of the member 120 and is configured to receive the retainer 124.

To assemble the rotatable bit cartridge 10, the member 120 is manufactured and the base 126 of the bit tip insert 118 is brazed in the first bore 138 of the member 120 creating a high strength braze joint, which may then be optionally hardened, before or after brazing the bit tip insert 118 in the first bore 138. The forward end 152 of the pin 122 may be press fitted into the second bore 148 of the member 120 and the retainer 124 is assembled around the annular groove 144 of the member 120. Optionally, a lubricating agent, such as graphite powder, graphene, granular lubricating powder, or the equivalent of any of the foregoing, is added to all components of the rotatable bit cartridge 10, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 in a separate brazing step, operation, or process. The bit holder 12 may then be heat treated. Alternatively, the bit holder 12 may be heat treated and the body 16 machined, if necessary, to accept the ring 60, and then the ring 60 is positioned around the forward extension 66 and brazed in the annular trough 64 of the bit holder body 16 in a separate brazing step, operation, or process. To assemble the unitary bit/holder 14 comprising the first embodiment of the rotatable bit cartridge 10 and the first embodiment of the bit holder 12, a tungsten carbide or hardened steel bushing 154 is assembled into the fourth bore section 108 of bore 74 and the assembled rotatable bit cartridge 10 is inserted into the bore 74 of the forward extension 66 of the bit holder body 16, shown in detail in FIG. 3 and in FIG. 7A. The bit cartridge 10 is rotatable throughout within the unitary bit/holder 14 after insertion into the bit holder 12. The dowel pin 122 radially aligns the bit cartridge 10, supports radial loading, improves bit cartridge rotation, extends axial length of bearing support, and allows the bit cartridge 10 body to be used whether the rotatable bit cartridge 10 was heat treated or not heat treated.

Figure 4:
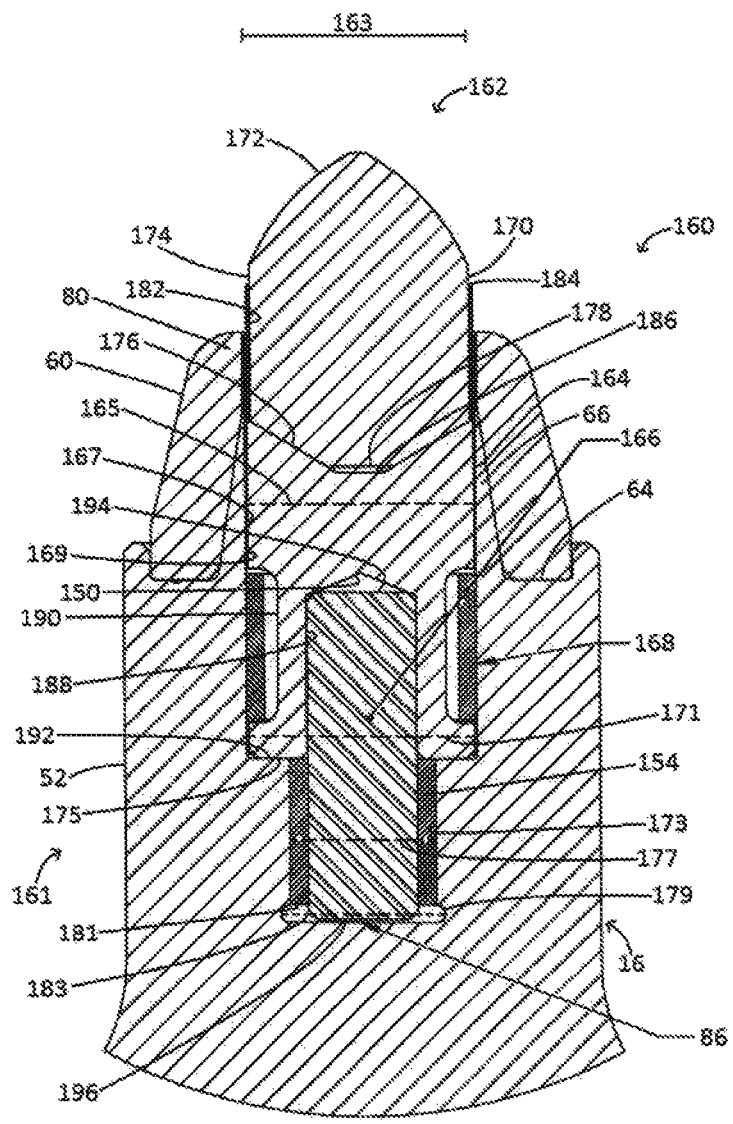
FIG. 4 is a detail cross-sectional view of a second embodiment of a unitary bit/holder and a second embodiment of a rotatable bit cartridge assembled in the unitary bit/holder, shown with a generally cylindrical retainer, in accordance with implementations of this disclosure.

Referring to FIG. 4, a second embodiment of a rotatable bit cartridge 160 is shown in detail in a second embodiment of a bit holder, tool, and/or pick 161 of the present disclosure. The rotatable bit cartridge 160 comprises a generally conical bit tip insert 162, a tungsten carbide or steel member 164, a tungsten carbide or hardened steel pin 166, and a straight sleeve annular retainer 168. The bit tip insert 162 comprises a base 170 and a tip 172 adjacent the base 170 that includes a parabolic curved section below an apex of the bit tip insert 162. The base 170 and/or the distal end may also be planar in an alternate embodiment. This tip 172 can have a frustoconical shape, a flat generally cylindrical puck shape, a parabolic ballistic shape, a conical shape, and/or an arcuate shape. In this second embodiment, the base 170 includes a generally cylindrical sidewall 174 and a frustoconical portion 176 adjacent a distal end 178 of the bit tip insert 162. In alternate embodiments, the base 170 can include a tapered sidewall (not shown) and the frustoconical portion 176 adjacent the distal end 178 of the bit tip insert 162, the base 170 can include a generally cylindrical sidewall 174 and a planar distal end (not shown) without a frustoconical portion, and the base 170 can include a tapered sidewall (not shown) and a planar distal end (not shown) without a frustoconical portion. In one exemplary implementation of the second embodiment, the bit tip insert 162 can have a diameter in the range of ⅝ inch to 1¼ inches. The bit tip insert 162 may be a tungsten carbide insert or may be a tungsten carbide insert that includes an overlay 180 (not shown) of a polycrystalline diamond structure that is applied to an outer surface of the tip 172. The overlay 180 may be a single coating or outer layer or multiple coatings or outer layers of such industrial diamond material, natural diamond, polycrystalline diamond (PCD) material, and polycrystalline diamond composite or PCD material.

The member 164 comprises an outer diameter 165 that is approximately 0.030 inch, in this exemplary implementation, larger than an upper outer diameter 163 of the bit tip insert 162 and comprises a generally cylindrical first bore 182 that axially extends inwardly from a forward end 184 of the member 164 to a first bore termination 186, which provides a space for receiving the complementary shaped sidewall 174 and planar or frustoconical portion 176 of the base 170 of the bit tip insert 162. The diameter 165 of the member 164 may be machined to a finished size before or after the bit tip insert 162 is brazed into the first bore 182 of the member 164. The remaining wall of the member 164 adjacent the inner portion 80 of the tungsten carbide ring 60 will wear away in use, causing the top portion of the sidewall 174 of the tungsten carbide base 170 of the bit tip insert 162 to contact and be supported by the dowel pin 166 and the generally cylindrical or tapered (not shown) top inner portion 80 of the tungsten carbide ring 60.

The member 164 further comprises a generally cylindrical second bore 188 that axially extends inwardly from a distal end 192 of the member 164 through an annular groove 190 of the member 154 adjacent the distal end 192 of the member 164 to a second bore termination 150, which in this embodiment, has a conical shape. The second bore 188 provides a space for receiving a forward end 194 of the dowel pin 166. The annular groove 190 of the member 164 includes a smaller diameter than the rest of the member 164 and is configured to receive the retainer 168.

Figure 1:
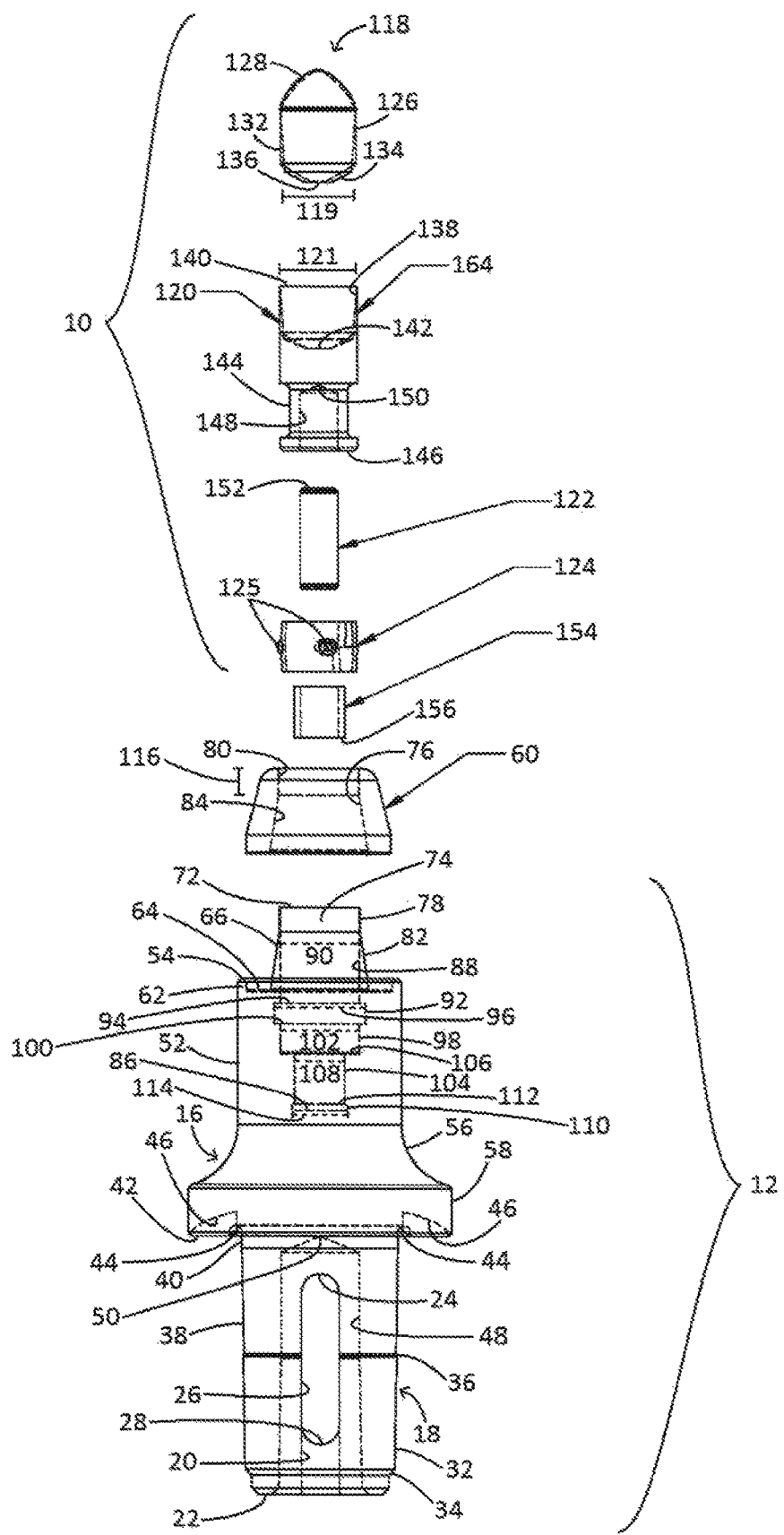
FIG. 1 is an exploded side view of a first embodiment of a unitary bit/holder and a first embodiment of a rotatable bit cartridge, showing invisible internal elements in dotted lines, in accordance with implementations of this disclosure.
Figure 2:
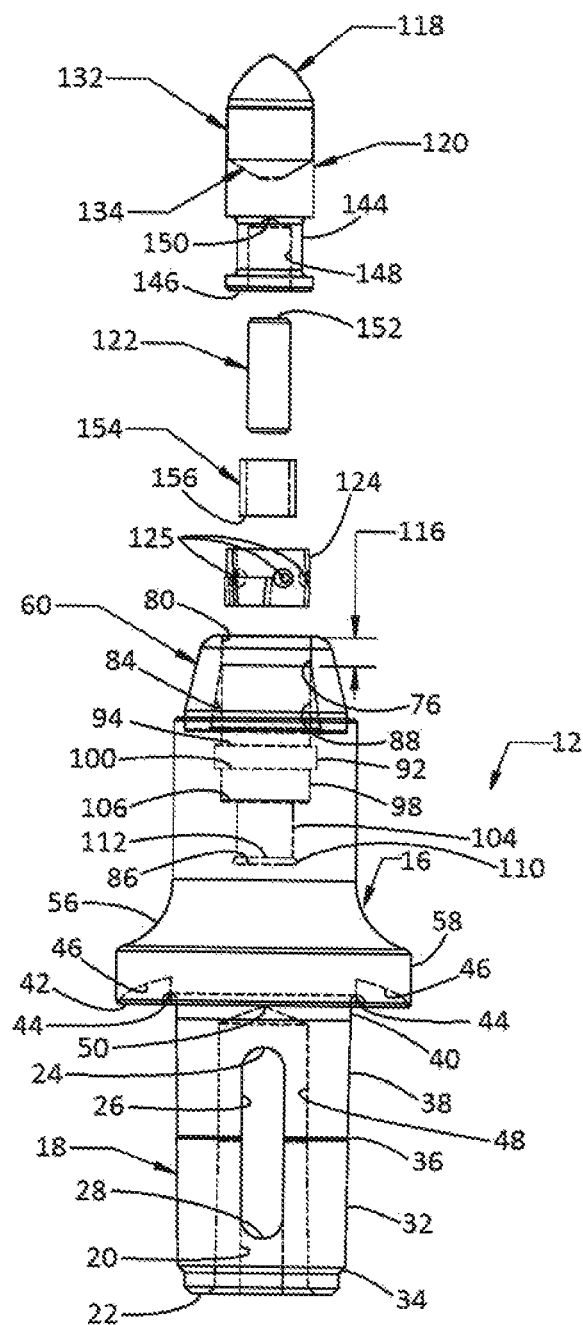
FIG. 2 is an exploded side view of the first embodiment of the unitary bit/holder and the first embodiment of the rotatable bit cartridge, showing a steel member assembled with a bit tip insert and showing invisible internal elements in dotted lines, in accordance with implementations of this disclosure.
Figure 3:
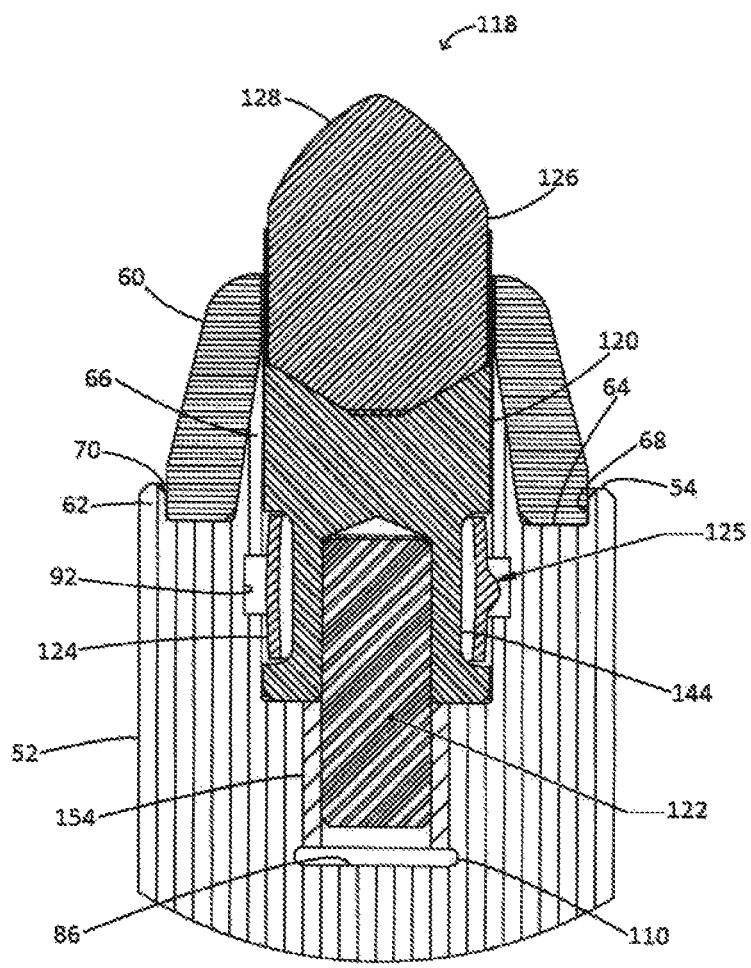
FIG. 3 is a detail cross-sectional view of the first embodiment of the unitary bit/holder and the first embodiment of the rotatable bit cartridge assembled in the unitary bit/holder, shown with a dimpled retainer, in accordance with implementations of this disclosure.

The second embodiment of the bit holder 161 is substantially the same as the first embodiment of the bit holder 12 with an exception that a generally cylindrical bore 167 of the bit holder 161 has a different configuration than the generally cylindrical bore 74 of the bit holder 12 (FIG. 1). The generally cylindrical bore 167 of the bit holder 161 extends axially inwardly from the top of the forward extension 66 of the bit holder body 16. In other embodiments, the bore 167 can also have a tapered bore or a slight draw or draft angle. The bore 167 extends from the forward end 72 of the bit holder body 16 to a bore termination 86 within the upper body portion 52 adjacent the mediate body portion 56 of the bit holder body 16. The bore 167 comprises a plurality of bore sections that may be generally cylindrical, tapered, and/or arcuate and that include various diameters as it extends from the forward end 72 to the bore termination 86. A generally cylindrical first bore section 169 of the bore 167, which axially extends from the forward end 72 of the bit holder body 16 to a location adjacent the annular trough 64, has a first diameter 171. A generally cylindrical second bore section 173 of the bore 167, which axially extends from a distal end 175 of the first bore section 169, has a second diameter 177 that is less than the first diameter 171. An arcuate third bore section 179, which axially extends from a distal end 181 of the second bore section 173 to the bore termination 86, has a third diameter 183 that is greater than the second diameter 177 and less than the first diameter 171. In this exemplary implementation of the second embodiment, the third bore section 179 has arcuate sidewalls.

To assemble the rotatable bit cartridge 160, the member 164 is manufactured and the base 170 of the bit tip insert 162 is brazed in the first bore 182 of the member 164 creating a high strength braze joint, which may then be optionally hardened, before or after brazing the bit tip insert 162 in the first bore 182. The forward end 194 of the pin 166 may be press fitted into the second bore 188 of the member 164 and the retainer 168 is assembled around the annular groove 190 of the member 164. Optionally, a lubricating agent, such as graphite powder, graphene, granular lubricating powder, or the equivalent of any of the foregoing, is added to all components of the rotatable bit cartridge 160, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 in a separate brazing step, operation, or process. The bit holder 161 may then be heat treated. Alternatively, the bit holder 161 may be heat treated and the body 16 machined, if necessary, to accept the ring 60, and then the ring 60 is positioned around the forward extension 66 and brazed in the annular trough 64 of the bit holder body 16 in a separate brazing step, operation, or process. To assemble the unitary bit/holder 14 comprising the second embodiment of the rotatable bit cartridge 160 and the second embodiment of the bit holder 161, a tungsten carbide or hardened steel bushing 154 is assembled into the second bore section 173 of bore 167 and the assembled rotatable bit cartridge 160 is inserted into the bore 167 of the forward extension 66 of the bit holder body 16, shown in detail in FIG. 4, where a distal end 196 of the dowel pin 166 may be used as an axial stop surface against bore termination 86 of bore 167. The bit cartridge 160 is rotatable throughout within the unitary bit/holder 14 after insertion into the bit holder 12. The dowel pin 166 radially aligns the bit cartridge 160, supports radial loading, improves bit cartridge rotation, extends axial length of bearing support, and allows the bit cartridge 160 body to be used whether the rotatable bit cartridge 160 was heat treated or not heat treated.

Referring to FIGS. 5 and 6, a third embodiment of a rotatable bit cartridge 200 is shown in detail in the first embodiment of the bit holder 12 of the present disclosure. The rotatable bit cartridge 200 comprises a generally conical bit tip insert 202, a tungsten carbide or steel member 204, a tungsten carbide or hardened steel pin 206, and a dimpled annular retainer 208 that includes at least one dimple 210 on an outer surface of sidewall 212 of the retainer 208. The annular sidewall 212 comprises a shortened portion 214 that has an axial length 216 that is less than an axial length 218 of the sidewall 212. The bit tip insert 202 comprises a base 220 and a tip 222 adjacent the base 220 that includes a parabolic curved section below an apex of the bit tip insert 202. The base 220 and/or the distal end may also be planar in an alternate embodiment. This tip 222 can have a frustoconical shape, a flat generally cylindrical puck shape, a parabolic ballistic shape, a conical shape, and/or an arcuate shape. In this third embodiment, the base 220 includes a generally cylindrical sidewall 224 that axially extends to a flat distal end 226 of the bit tip insert 202. In alternate embodiments, the base 220 can include a tapered sidewall (not shown), the base 220 can include a generally cylindrical sidewall 224 and a planar distal end (not shown) without a frustoconical portion, and the base 224 can include a tapered sidewall (not shown) and a planar distal end (not shown) without a frustoconical portion. In one exemplary implementation of the third embodiment, the bit tip insert 202 can have a diameter in the range of ⅝ inch to 1¼ inches. The bit tip insert 202 may be a tungsten carbide insert or may be a tungsten carbide insert that includes an overlay 228 (not shown) of a polycrystalline diamond structure that is applied to an outer surface of the tip 222. The overlay 228 may be a single coating or outer layer or multiple coatings or outer layers of such industrial diamond material, natural diamond, polycrystalline diamond (PCD) material, and polycrystalline diamond composite or PCD material.

The member 204 comprises an outer diameter 205 that is approximately 0.030 inch, in this exemplary implementation, larger than an upper outer diameter 203 of the bit tip insert 202 and comprises a generally cylindrical first bore 230 that axially extends inwardly from a forward end 232 of the member 204 to a first bore termination 234, which provides a space for receiving the complementary shaped sidewall 224 and distal end 226 of the base 220 of the bit tip insert 202. The diameter 205 of the member 204 may be machined to a finished size before or after the bit tip insert 202 is brazed into the first bore 230 of the member 204. The remaining wall of the member 204 adjacent the inner portion 80 of the tungsten carbide ring 60 will wear away in use, causing the top portion of the sidewall 224 of the tungsten carbide base 220 of the bit tip insert 202 to contact and be supported by the dowel pin 206 and the generally cylindrical or tapered (not shown) top inner portion 80 of the tungsten carbide ring 60.

The member 204 further comprises a generally cylindrical second bore 236 that axially extends inwardly from a distal end 238 of the member 204 through an annular groove 240 of the member 204 adjacent the distal end 238 of the member 204 to a second bore termination 242, which in this embodiment, has a conical shape. The second bore 236 provides a space for receiving a forward end 244 of the dowel pin 206, which may be press fitted into the member 204. The annular groove 240 of the member 204 includes a smaller diameter than the rest of the member 204 and is configured to receive the retainer 208.

To assemble the rotatable bit cartridge 200, the member 204 is manufactured and the base 220 of the bit tip insert 202 is brazed in the first bore 230 of the member 204 creating a high strength braze joint, which may then be optionally hardened, before or after brazing the bit tip insert 202 in the first bore 230. The forward end 244 of the pin 206 may then be press fitted into the second bore 236 of the member 204 and the retainer 208 is assembled around the annular groove 240 of the steel member 204. Optionally, a lubricating agent, such as graphite powder, graphene, granular lubricating powder, or the equivalent of any of the foregoing, is added to all components of the rotatable bit cartridge 200, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 in a separate brazing step, operation, or process. The bit holder 12 may then be heat treated. Alternatively, the bit holder 12 may be heat treated and the body 16 machined, if necessary, to accept the ring 60, and then the ring 60 is positioned around the forward extension 66 and brazed in the annular trough 64 of the bit holder body 16 in a separate brazing step, operation, or process. To assemble the unitary bit/holder 14 comprising the third embodiment of the rotatable bit cartridge 200 and the first embodiment of the bit holder 12, a tungsten carbide or hardened steel bushing 154 is assembled into the fourth bore section 108 of bore 74 and the assembled rotatable bit cartridge 200 is inserted into the bore 74 of the forward extension 66 of the bit holder body 16, shown in detail in FIG. 5 and in FIG. 6. The bit cartridge 200 is rotatable throughout within the unitary bit/holder 14 after insertion into the bit holder 12. The dowel pin 206 radially aligns the bit cartridge 200, supports radial loading, improves bit cartridge rotation, extends axial length of bearing support, and allows the bit cartridge 200 body to be used regardless of whether the rotatable bit cartridge 200 was heat treated or not heat treated.

Figure 7B:
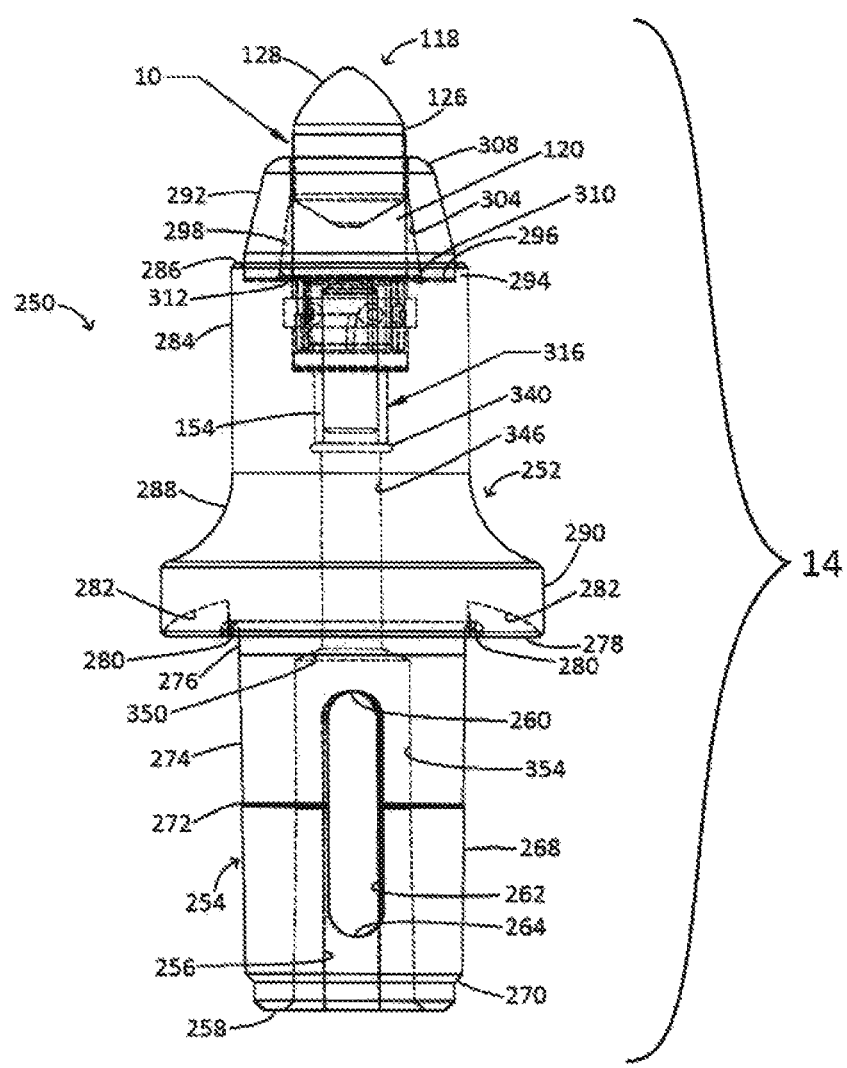
FIG. 7B is a side elevation view of a third embodiment of a unitary bit/holder and the first embodiment of the rotatable bit cartridge assembled in the unitary bit/holder, showing invisible internal elements in dotted lines, in accordance with implementations of this disclosure.
Figure 20:
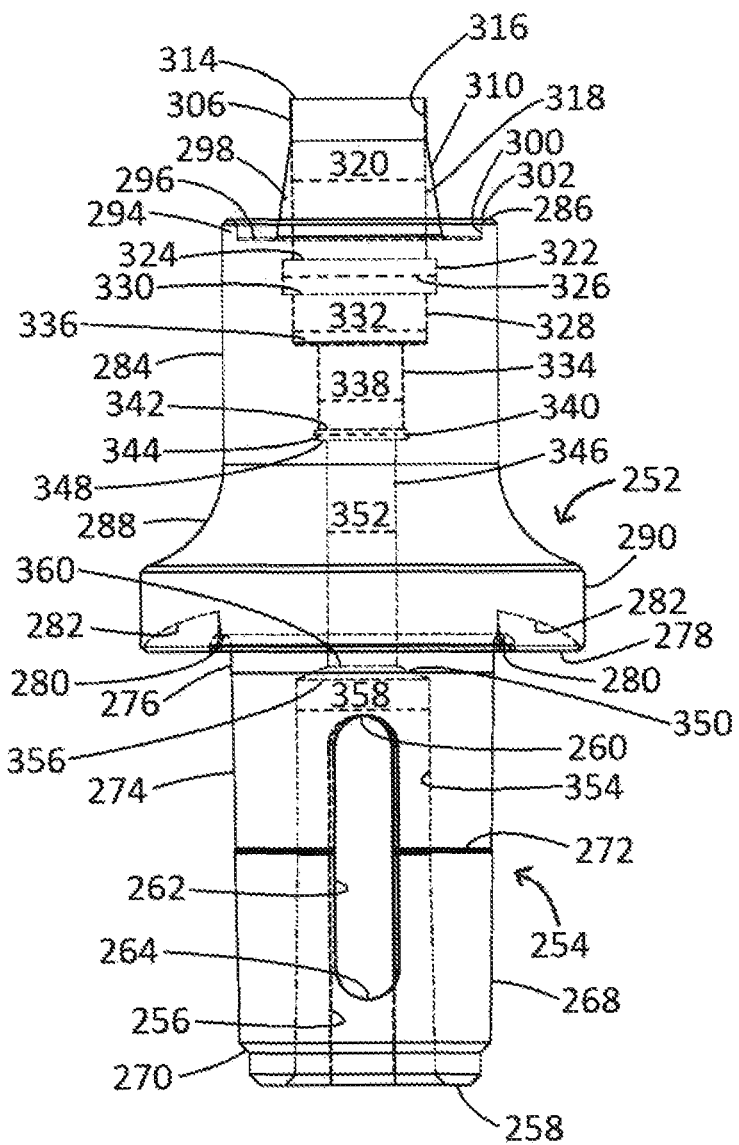
FIG. 20 is a side elevation view of the third embodiment of the unitary bit/holder of FIG. 7B, showing invisible internal elements in dotted lines, in accordance with implementations of this disclosure.

Referring to FIGS. 7B and 20, the first embodiment of the rotatable bit cartridge 10 (FIG. 7B) is shown assembled in a third embodiment of a bit holder, tool, and/or pick 250 (FIGS. 7B and 20) of the present disclosure form a unitary structure bit and bit holder construction of a bit/holder and/or pick 14. The third embodiment of the bit holder 250 comprises a body 252 and a generally cylindrical hollow shank 254 depending from a bottom of the body 252. The shank 254 includes an elongate first slot 256 extending from a generally annular distal end 258 of the shank 254 axially upward or forward to an upper termination 260 adjacent the upper or forward end of the shank 254. In this illustrated embodiment, the shank 254 also includes an internally oriented second slot 262 located approximately 180 degrees around the annular shank 254 from the first slot 256. The second slot 262 is parallel to the first slot 256 and is an internal slot including a rearward semicircular termination 264 inwardly adjacent the distal end 258 of the shank 254 and a forward semicircular termination 266 (not shown) generally coinciding longitudinally and axially with the upper termination 260 of the first slot 256.

In this third embodiment of the bit holder 250, the shank 254 includes a lower or first tapered portion 268 running axially from a stepped shoulder 270 adjacent the distal end 258 of the shank 254. The stepped shoulder 270 is disposed between the lower tapered portion 268 and the distal end 258. A diameter of the stepped shoulder 270 increases, or steps up, in this embodiment, as it axially extends from the distal end 258 to the lower tapered portion 268. The first tapered portion 268 runs upwardly or axially from the stepped shoulder 270 of the shank 254 and terminates generally mid first slot 256 longitudinally. The shank 254 also includes an annular shoulder 272 separating the lower tapered portion 268 from an upper or second tapered portion 274 which extends from the shoulder 272 to generally adjacent to the top of the shank 254 or forward terminations 260, 266 of slots 256, 262, respectively. The annular shoulder 272 is disposed between the lower tapered portion 268 and the upper tapered portion 274. A diameter of the annular shoulder 272 decreases, or steps down, in this embodiment, as it axially extends from the lower tapered portion 268 to the upper tapered portion 274. In other embodiments, the lower portion 268 and/or the upper portion 274 may comprise a generally cylindrical shape, a slight draw angle, or a slight draft angle.

A generally cylindrical top portion 276 of the shank 254 extends from a position adjacent the top or upper terminations 260, 266 of slots 256, 262, respectively, towards a generally annular back flange 278 that denotes the base or bottom of the body 252 of the bit holder 250. The top of the shank 254 may include a rounded junction 280 between the top portion 276 of the shank 254 and the generally annular flange 278 of the body 252 of the bit holder 250, which is provided to avoid sharp corners which may provide an area for stress cracks to begin. The generally annular flange 278 includes a pair of horizontal slots 282-282 generally perpendicular to the longitudinal axis of the combination bit/holder, one on either side of the generally annular flange 278. The horizontal slots 282-282 are configured to receive a pair of bifurcated fork tines that may be inserted between the base of the body 252 of the bit holder 250 and a base block (not shown) into which the shank 254 of the unitary bit/holder 14 is inserted and retained by outward radial force in use.

In this third illustrated embodiment of the bit holder 250, the bit holder body 252 includes a generally cylindrical or annular upper body portion 284 depending from a forward end 286 of the upper body portion 284. A mediate body portion 288 subjacent the upper body portion 284 generally slopes axially and radially outwardly to a radially extending generally cylindrical tire portion 290.

The bit holder body 252, in order to provide superior brazing of a tungsten carbide ring 292 to the forward end 286 of the upper body portion 284, includes a forwardly extending annular collar 294 that is created on the bit holder body 252 to provide an annular trough 296 around a forward extension 298 of the bit holder body 252 onto which the annular ring 292 is mounted. In this illustrated embodiment, the annular collar 294 includes a cylindrical bottom inner wall 300 (FIG. 20) and a tapered top inner wall or countersink 302 (FIG. 20). The vertical outer wall of the collar 294 will keep brazing material from flowing outwardly of the joinder between the base of the ring 292 and the annular trough 296 on which the ring 292 is positioned. The annular trough 296 is therearound positioned perpendicular to the axis of the bit holder 250 from the interior of which axially extends the smaller radially oriented annular upper or forward extension 298. Around this tapered forward extension 298 is fitted the annular tungsten carbide ring 292, the forward extension 298 extending through a bore 304 that extends through the annular tungsten carbide ring 292 allowing a bottom of the ring 292 to be seated in the annular trough 296, which may be brazed into unitary construction with the remainder of the bit holder 250. The bit holder 250 may be machined and hardened, or partially machined, hardened, and then finished machined. The annular tungsten carbide ring 292 may be brazed before or after hardening of the bit holder 250.

In this exemplary implementation of the third embodiment of the bit holder 250, the forward extension 298 includes a generally cylindrical top portion 306 (not shown) that is complementary shaped to a generally cylindrical top inner portion 308 of the bore 304 of the ring 292 and an outwardly tapered bottom portion 310 that is complementary shaped to an outwardly tapered bottom inner portion 312 of the bore 304 of the ring 292. An axial length of the ring 292, corresponding to the generally cylindrical top inner portion 308 of the bore 304 of the ring 292, is adapted to maintain radial support. In other implementations, the forward extension 298 and the bore 304 of the ring 292 can have other complementary shaped surfaces. The top or forwardmost portion of the tungsten carbide ring 292 and the annular tapered forward extension 298 of the bit holder body 252 terminate generally at a forward end 314 of the bit holder body 252 of the bit holder 250.

With the bit holder body 252 of the present disclosure in this embodiment made of 4340 or equivalent steel, whether direct hardened or carburized and hardened, the top of the forward extension 298 of the bit holder body 252 includes a central bore 316 longitudinally and axially extending from the co-terminal upper wall of the body to the distal end 258 of the shank 254. In this exemplary implementation of the third embodiment of the bit holder 250, the bore 316 comprises a plurality of bore sections that may be generally cylindrical, tapered, and/or arcuate and that include various diameters as it extends from the forward end 314 to the distal end 258, as shown in FIG. 20. A generally cylindrical first bore section 318 of the bore 316, which axially extends from the forward end 314 of the bit holder body 252 to a location adjacent the annular trough 296, has a first diameter 320. A generally cylindrical second bore section 322 of the bore 316, which axially extends from a distal end 324 of the first bore section 318, has a second diameter 326 that is greater than the first diameter 320. A generally cylindrical third bore section 328 of the bore 316, which axially extends from a distal end 330 of the second bore section 322, has a third diameter 332 that is approximately the first diameter 320 of the first bore section 318. A generally cylindrical fourth bore section 334 of the bore 316, which axially extends from a distal end 336 of the third bore section 328, has a fourth diameter 338 that is less than the first diameter 320, the second diameter 326, and the third diameter 332. An arcuate fifth bore section 340 of the bore 316, which axially extends from a distal end 342 of the fourth bore section 334, has a fifth diameter 344 that is greater than the fourth diameter 338 and less than the first diameter 320, the second diameter 326, and the third diameter 332. In this exemplary implementation of the third embodiment, the fifth bore section 340 has arcuate sidewalls. A generally cylindrical sixth bore section 346 of the bore 316, which axially extends from a distal end 348 of the fifth bore section 340 to a stepped shoulder 350, has a sixth diameter 352 that is less than the first diameter 320, the second diameter 326, the third diameter 332, the fourth diameter 338, and the fifth diameter 344. A generally cylindrical seventh bore section 354 of the bore 316, which axially extends from a distal end 356 of the stepped shoulder 350 adjacent the sixth bore section 346, has a seventh diameter 358 that is greater than the first diameter 320, the second diameter 326, the third diameter 332, the fourth diameter 338, the fifth diameter 344, and the sixth diameter 352. A diameter of the stepped shoulder 350 increases, or steps up, in this embodiment, as it axially extends from a distal end 360 of the sixth bore section 346 to the seventh bore section 354. In other embodiments, the seventh bore section 354 can be generally cylindrical, tapered, or include a slight draw or draft angle. This seventh bore section 354 of the bore 316 allows the generally C-shaped annular sidewall of the shank 254 to radially contract when the shank 254 is mounted in a tapered and/or cylindrical bore in a base block (not shown).

The first bore section 318, second bore section 322, and third bore section 328 of the bore 316 provide space for receiving the complementary shaped first embodiment of the rotatable bit cartridge 10. To assemble the rotatable bit cartridge 10, the member 120 is manufactured and the base 126 of the bit tip insert 118 is brazed in the first bore 138 of the member 120 creating a high strength braze joint, which may then be optionally hardened, before or after brazing the bit tip insert 118 in the first bore 138. The forward end 152 of the pin 122 may be press fitted into the second bore 148 of the member 120 and the retainer 124 is assembled around the annular groove 144 of the member 120. Optionally, a lubricating agent, such as graphite powder, graphene, granular lubricating powder, or the equivalent of any of the foregoing, is added to all components of the rotatable bit cartridge 10, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 in a separate brazing step, operation, or process. The bit holder 250 may then be heat treated. Alternatively, the bit holder 250 may be heat treated and the body 16 machined, if necessary, to accept the ring 60, and then the ring 60 is positioned around the forward extension 66 and brazed in the annular trough 64 of the bit holder body 16 in a separate brazing step, operation, or process. To assemble the unitary bit/holder 14 comprising the first embodiment of the rotatable bit cartridge 10 and the third embodiment of the bit holder 250, the tungsten carbide or hardened steel bushing 154 is assembled into the fourth bore section 334 of the bore 316 and the assembled rotatable bit cartridge 10 is inserted into the bore 316 adjacent the forward end 314 of the bit holder body 252. The bit cartridge 10 is rotatable throughout within the unitary bit/holder 14 after insertion into the bit holder 250. The dowel pin 122 radially aligns the bit cartridge 10, supports radial loading, improves bit cartridge rotation, extends axial length of bearing support, and allows the bit cartridge 10 body to be used regardless of whether the rotatable bit cartridge 10 was heat treated or not heat treated.

Figure 8A:
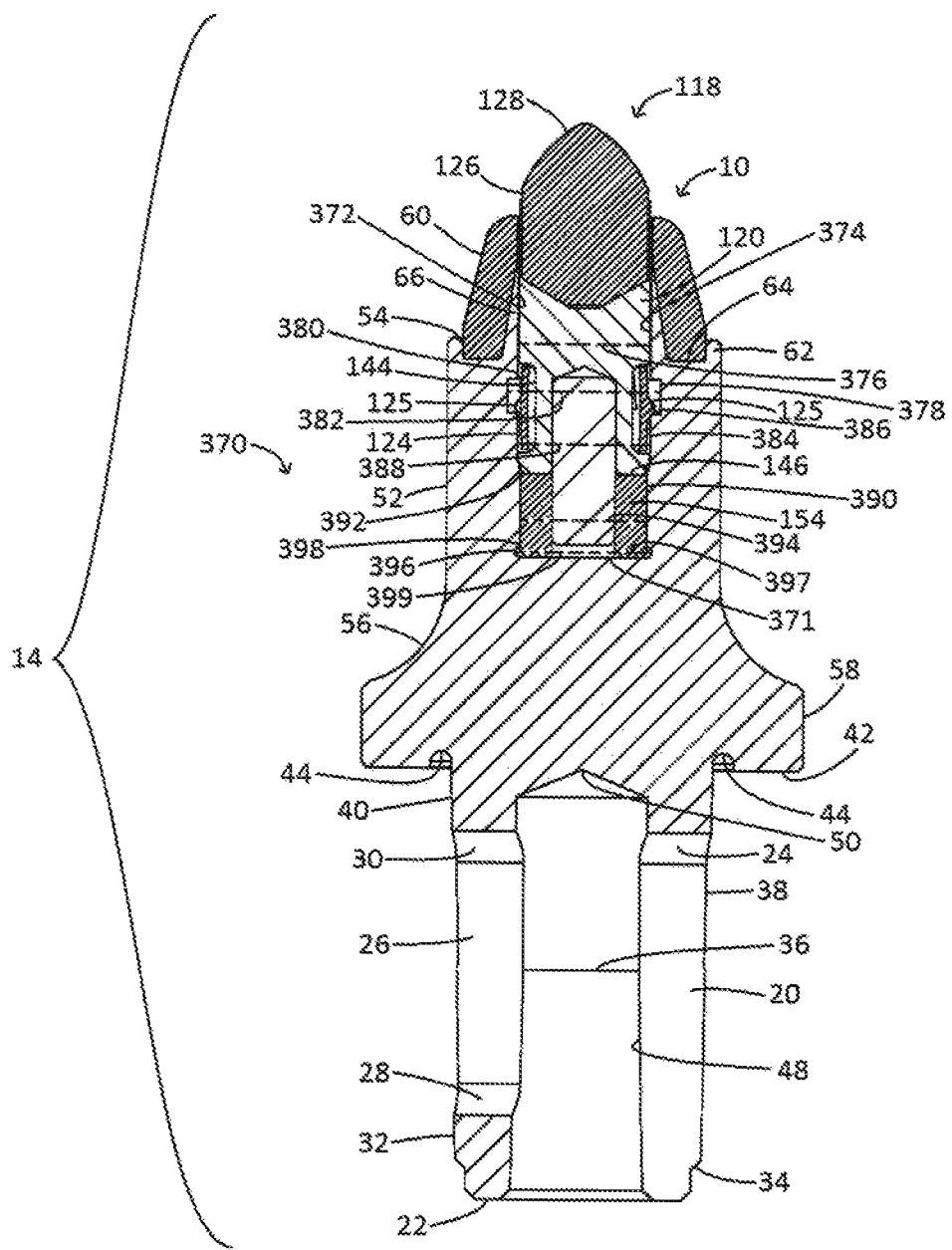
FIG. 8A is a cross-sectional view of a fourth embodiment of a unitary bit/holder and the first embodiment of the rotatable bit cartridge in accordance with implementations of this disclosure.

Referring to FIG. 8A, the first embodiment of the rotatable bit cartridge 10 is shown assembled in a fourth embodiment of a bit holder, tool, and/or pick 370 of the present disclosure. The fourth embodiment of the bit holder 370 is substantially the same as the first embodiment of the bit holder 12 with an exception that a generally cylindrical bore 372 of the bit holder 370 has a different configuration than the generally cylindrical bore 74 of the bit holder 12 (FIG. 1). The generally cylindrical bore 372 of the bit holder 370 extends axially inwardly from the top of the forward extension 66 of the bit holder body 16. In other embodiments, the bore 372 can also have a tapered bore or a slight draw or draft angle. The bore 372 extends from the forward end 72 of the bit holder body 16 to a bore termination 371 within the upper body portion 52 adjacent the mediate body portion 56 of the bit holder body 16. The bore 372 comprises a plurality of bore sections that may be generally cylindrical, tapered, and/or arcuate and that include various diameters as it extends from the forward end 72 to the bore termination 371. A generally cylindrical first bore section 374 of the bore 372, which axially extends from the forward end 72 of the bit holder body 16 to a location adjacent the annular trough 64, has a first diameter 376. A generally cylindrical second bore section 378 of the bore 372, which axially extends from a distal end 380 of the first bore section 374, has a second diameter 382 that is greater than the first diameter 376. A generally cylindrical third bore section 384 of the bore 372, which axially extends from a distal end 386 of the second bore section 378, has a third diameter 388 that is approximately the first diameter 376 of the first bore section 374. A generally cylindrical fourth bore section 390 of the bore 372, which axially extends from a distal end 392 of the third bore section 384, has a fourth diameter 394 that is approximately the first diameter 376 and the third diameter 388 and less than the second diameter 382. An arcuate fifth bore section 396 of the bore 372, which axially extends from a distal end 398 of the fourth bore section 390 to the bore termination 86, has a fifth diameter 399 that is less than the second diameter 382 and greater than the first diameter 376, the third diameter 388, and the fourth diameter 394. In this exemplary implementation of the fourth embodiment, the fifth bore section 396 has arcuate sidewalls.

The first bore section 374, second bore section 378, and third bore section 384 of the bore 372 provide space for receiving the complementary shaped first embodiment of the rotatable bit cartridge 10. To assemble the rotatable bit cartridge 10, the member 120 is manufactured and the base 126 of the bit tip insert 118 is brazed in the first bore 138 of the member 120 creating a high strength braze joint, which may then be optionally hardened, before or after brazing the bit tip insert 118 in the first bore 138. The forward end 152 of the pin 122 may be press fitted into the second bore 148 of the member 120 and the retainer 124 is assembled around the annular groove 144 of the member 120. Optionally, a lubricating agent, such as graphite powder, graphene, granular lubricating powder, or the equivalent of any of the foregoing, is added to all components of the rotatable bit cartridge 10, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 in a separate brazing step, operation, or process. The bit holder 370 may then be heat treated. Alternatively, the bit holder 370 may be heat treated and the body 16 machined, if necessary, to accept the ring 60, and then the ring 60 is positioned around the forward extension 66 and brazed in the annular trough 64 of the bit holder body 16 in a separate brazing step, operation, or process. To assemble the unitary bit/holder 14 comprising the first embodiment of the rotatable bit cartridge 10 and the fourth embodiment of the bit holder 370, the tungsten carbide or hardened steel bushing 154 is assembled into the fourth bore section 390 of the bore 372, such that a distal end 397 of the bushing 154 contacts the first bore termination 406, and the assembled rotatable bit cartridge 10 is inserted into the bore 372 adjacent the forward end 72 of the bit holder body 16. The bit cartridge 10 is rotatable throughout within the unitary bit/holder 14 after insertion into the bit holder 370. The dowel pin 122 (FIG. 7A) radially aligns the bit cartridge 10, supports radial loading, improves bit cartridge rotation, extends axial length of bearing support, and allows the bit cartridge 10 body to be used regardless of whether the rotatable bit cartridge 10 was heat treated or not heat treated.

Figure 8B:
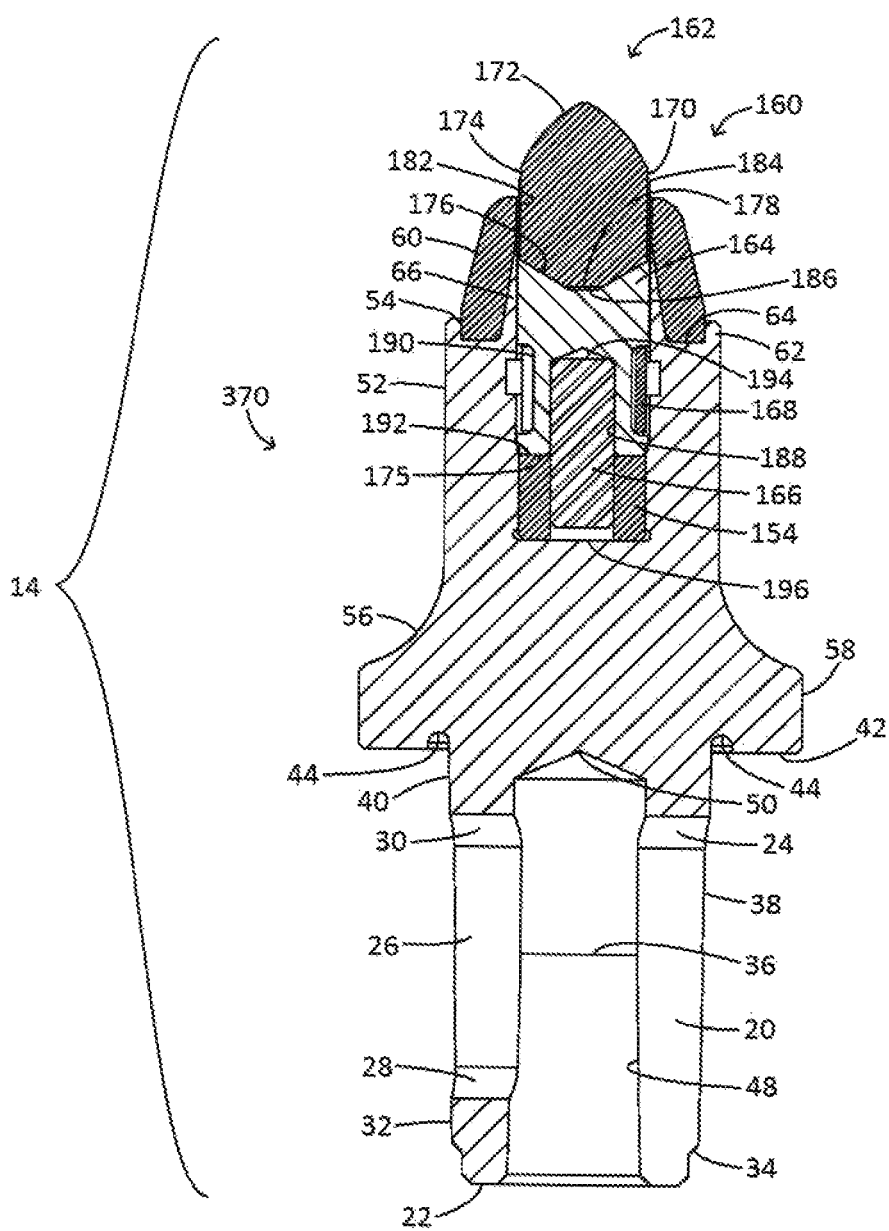
FIG. 8B is a cross-sectional view of the fourth embodiment of the unitary bit/holder and the second embodiment of the rotatable bit cartridge in accordance with implementations of this disclosure.

Referring to FIG. 8B, the second embodiment of the rotatable bit cartridge 160 is shown assembled in the fourth embodiment of the bit holder 370 of the present disclosure. The first bore section 374, second bore section 378, and third bore section 384 of the bore 372 (shown in FIG. 8A) provide space for receiving the complementary shaped second embodiment of the rotatable bit cartridge 160. To assemble the rotatable bit cartridge 160, the member 164 is manufactured and the base 170 of the bit tip insert 162 is brazed in the first bore 182 of the member 164 creating a high strength braze joint, which may then be optionally hardened, before or after brazing the bit tip insert 162 in the first bore 182. The forward end 194 of the pin 166 may be press fitted into the second bore 188 of the member 164 and the retainer 168 is assembled around the annular groove 190 of the member 164. Optionally, a lubricating agent, such as graphite powder, graphene, granular lubricating powder, or the equivalent of any of the foregoing, is added to all components of the rotatable bit cartridge 160, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 in a separate brazing step, operation, or process. The bit holder 370 may then be heat treated. Alternatively, the bit holder 370 may be heat treated and the body 16 machined, if necessary, to accept the ring 60, and then the ring 60 is positioned around the forward extension 66 and brazed in the annular trough 64 of the bit holder body 16 in a separate brazing step, operation, or process. To assemble the unitary bit/holder 14 comprising the second embodiment of the rotatable bit cartridge 160 and the fourth embodiment of the bit holder 370, the tungsten carbide or hardened steel bushing 154 is assembled into the fourth bore section 390 of the bore 372 and the assembled rotatable bit cartridge 160 is inserted into the bore 372 adjacent the forward end 72 of the bit holder body 16. The bit cartridge 160 is rotatable throughout within the unitary bit/holder 14 after insertion into the bit holder 370. The dowel pin 122 radially aligns the bit cartridge 160, supports radial loading, improves bit cartridge rotation, extends axial length of bearing support, and allows the bit cartridge 10 body to be used regardless of whether the rotatable bit cartridge 160 was heat treated or not heat treated.

Figure 9:
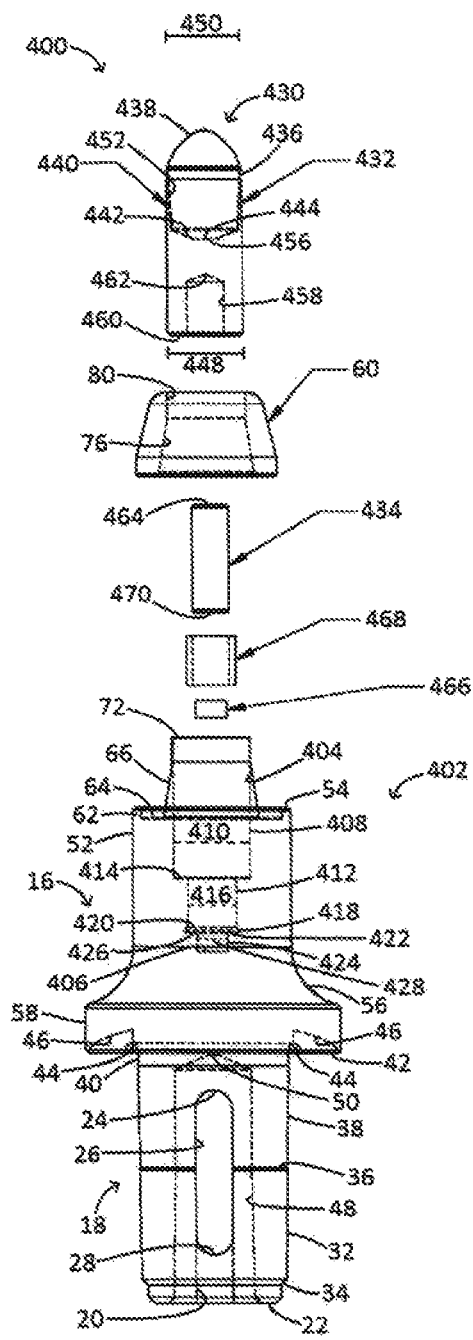
FIG. 9 is an exploded side view of a fifth embodiment of a unitary bit/holder and a fourth embodiment of a rotatable bit cartridge, showing a steel member assembled with a bit tip insert and showing invisible internal elements in dotted lines, in accordance with implementations of this disclosure.
Figure 10:
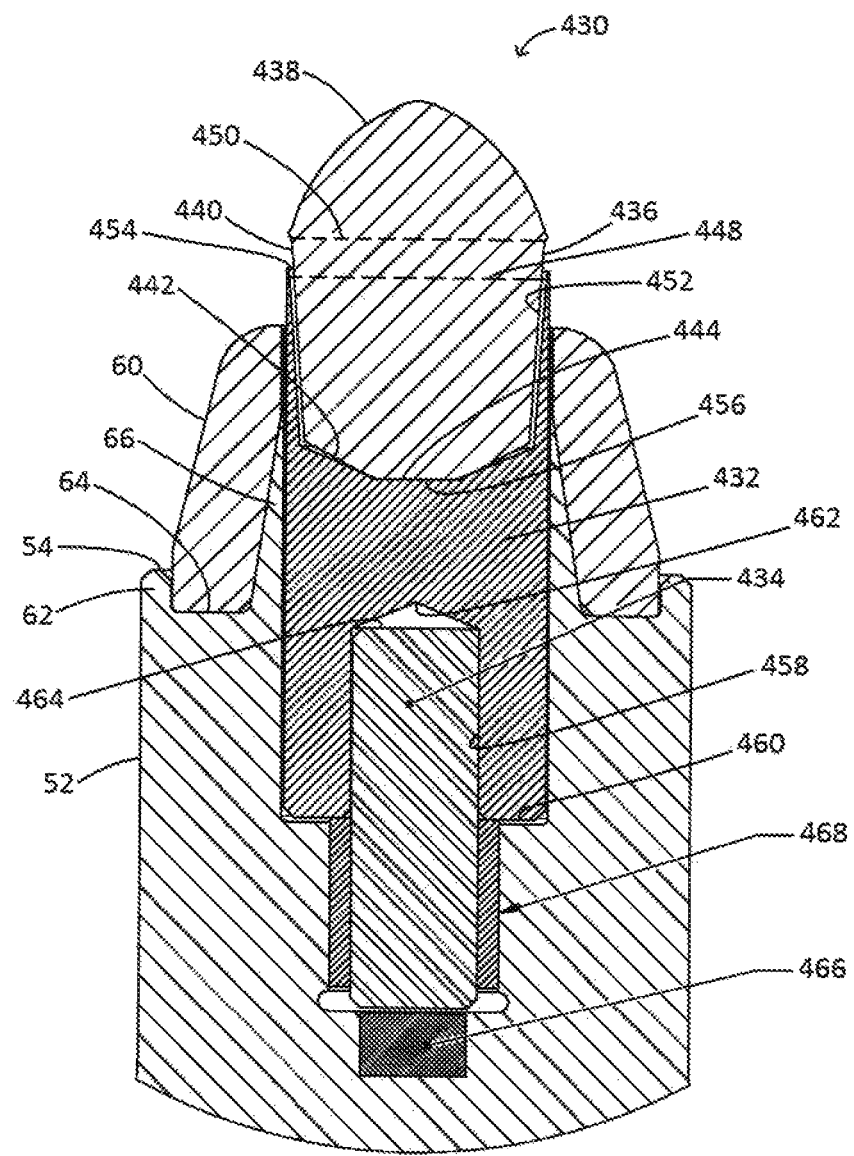
FIG. 10 is a detail cross-sectional view of the fifth embodiment of the unitary bit/holder and the fourth embodiment of the rotatable bit cartridge assembled in the unitary bit/holder in accordance with implementations of this disclosure.
Figure 11:
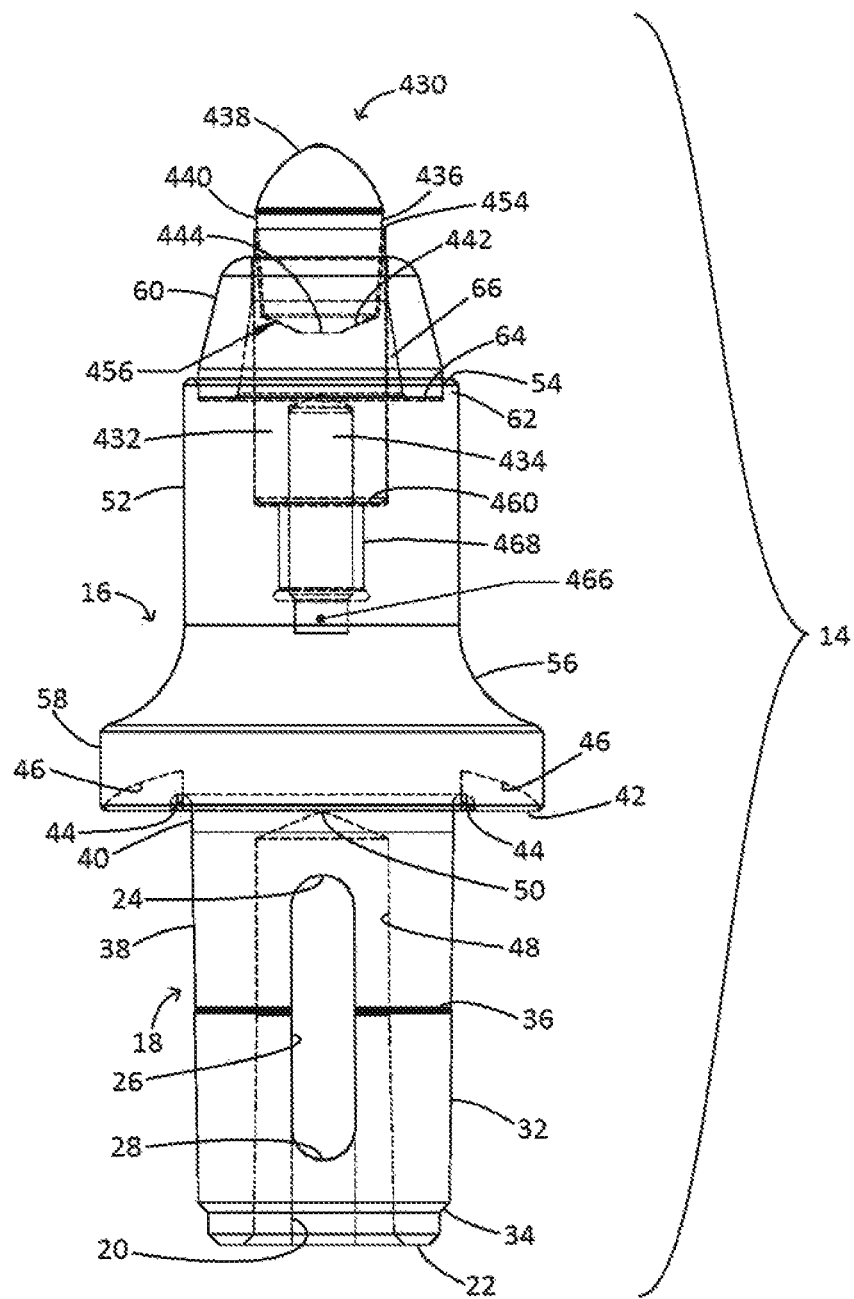
FIG. 11 is a side elevation view of the fifth embodiment of the unitary bit/holder and the fourth embodiment of the rotatable bit cartridge assembled with the unitary bit/holder, showing invisible internal elements in dotted lines, in accordance with implementations of this disclosure.

Referring to FIGS. 9-11, a fourth embodiment of a rotatable bit cartridge 400 and a fifth embodiment of a bit holder, tool, and/or pick 402 of the present disclosure form a unitary structure bit and bit holder construction of a bit/holder and/or pick 14 (FIG. 11). The fifth embodiment of the bit holder 402 is substantially the same as the first embodiment of the bit holder 12 with an exception that a generally cylindrical bore 404 of the bit holder 402 has a different configuration than the generally cylindrical bore 74 of the bit holder 12 (FIG. 1). The generally cylindrical bore 404 of the bit holder 402 extends axially inwardly from the top of the forward extension 66 of the bit holder body 16. In other embodiments, the bore 404 can also have a tapered bore or a slight draw or draft angle. The bore 404 extends from the forward end 72 of the bit holder body 16 to a bore termination 406 within the mediate body portion 56 of the bit holder body 16. The bore 404 comprises a plurality of bore sections that may be generally cylindrical, tapered, and/or arcuate and that include various diameters as it extends from the forward end 72 to the bore termination 406. A generally cylindrical first bore section 408 of the bore 404, which axially extends from the forward end 72 of the bit holder body 16 to a location approximately mid upper body portion 52 in this exemplary implementation, has a first diameter 410. A generally cylindrical second bore section 412 of the bore 404, which axially extends from a distal end 414 of the first bore section 408, has a second diameter 416 that is less than the first diameter 410. An arcuate third bore section 418 of the bore 404, which axially extends from a distal end 420 of the second bore section 412, has a third diameter 422 that is less than the first diameter 410 and greater than the second diameter 416. In this exemplary implementation of the fifth embodiment, the third bore section 418 has arcuate sidewalls. A generally cylindrical fourth bore section 424 of the bore 404, which axially extends from a distal end 426 of the third bore section 418 to the bore termination 406, has a fourth diameter 428 that is less than the first diameter 410, the second diameter 416, and the third diameter 422.

The fourth embodiment of the rotatable bit cartridge 400 (FIG. 9), shown in detail in FIG. 10, comprises a generally conical bit tip insert 430, a tungsten carbide or steel member 432, and a tungsten carbide or hardened steel pin 434. The bit tip insert 430 comprises a base 436 and a tip 438 adjacent the base 436 that includes a parabolic curved section below an apex of the bit tip insert 430. The base 436 and/or the distal end may also be planar in an alternate embodiment. This tip 438 can have a frustoconical shape, a flat generally cylindrical puck shape, a parabolic ballistic shape, a conical shape, and/or an arcuate shape. In this fourth embodiment, the base 436 includes a tapered sidewall 440 and a frustoconical portion 442 adjacent a distal end 444 of the bit tip insert 430. In alternate embodiments, the base 436 can include a cylindrical sidewall (not shown) and the frustoconical portion 442 adjacent the distal end 444 of the bit tip insert 430, the base 436 can include a generally cylindrical sidewall (not shown) and a planar distal end (not shown) without a frustoconical portion, and the base 436 can include a tapered sidewall 440 and a planar distal end (not shown) without a frustoconical portion. In one exemplary implementation of the fourth embodiment, the bit tip insert 430 can have a diameter in the range of ⅝ inch to 1¼ inches. The bit tip insert 430 may be a tungsten carbide insert or may be a tungsten carbide insert that includes an overlay 446 (not shown) of a polycrystalline diamond structure that is applied to an outer surface of the tip 438. The overlay 446 may be a single coating or outer layer or multiple coatings or outer layers of such industrial diamond material, natural diamond, polycrystalline diamond (PCD) material, and polycrystalline diamond composite or PCD material.

The member 432 comprises an outer diameter 448 that is approximately 0.030 inch, in this exemplary implementation, larger than an upper outer diameter 450 (FIG. 10) of the bit tip insert 430 and comprises a tapered first bore 452 (FIG. 10) that axially extends inwardly from a forward end 454 of the member 432 to a first bore termination 456, which provides a space for receiving the complementary shaped sidewall 440 and planar or frustoconical portion 442 of the base 436 of the bit tip insert 430. The diameter 448 of the member 432 may be machined to a finished size before or after the bit tip insert 430 is brazed into the first bore 452 of the member 432. The remaining wall of the member 432 adjacent the inner portion 80 of the tungsten carbide ring 60 will wear away in use, causing the top portion of the sidewall 440 of the tungsten carbide base 436 of the bit tip insert 430 to contact and be supported by the dowel pin 434 and the generally cylindrical or tapered (not shown) top inner portion 80 of the tungsten carbide ring 60. The member 432 further comprises a generally cylindrical second bore 458 that axially extends inwardly from a distal end 460 of the member 432 to a second bore termination 462, which in this embodiment, has a conical shape. The second bore 458 provides a space for receiving a forward end 464 of the dowel pin 434.

To assemble the rotatable bit cartridge 400 (FIG. 9), the member 432 is manufactured and the base 436 of the bit tip insert 430 is brazed in the first bore 452 of the member 432 creating a high strength braze joint, which may then be optionally hardened, before or after brazing the bit tip insert 430 in the first bore 452. The forward end 464 of the pin 434 may be press fitted into the second bore 458 of the member 432. Optionally, a lubricating agent, such as graphite powder, graphene, granular lubricating powder, or the equivalent of any of the foregoing, is added to all components of the rotatable bit cartridge 400, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 in a separate brazing step, operation, or process. The bit holder 402 may then be heat treated. Alternatively, the bit holder 402 may be heat treated and the body 16 machined, if necessary, to accept the ring 60, and then the ring 60 is positioned around the forward extension 66 and brazed in the annular trough 64 of the bit holder body 16 in a separate brazing step, operation, or process. To assemble the unitary bit/holder 14 (FIG. 11) comprising the fourth embodiment of the rotatable bit cartridge 400 (FIG. 9) and the fifth embodiment of the bit holder 402, a magnet 466 is mounted in the fourth bore section 424 of the bore 404 and a tungsten carbide or hardened steel bushing 468 is mounted in the second bore section 412 of the bore 404. The assembled rotatable bit cartridge 400 is inserted into the bore 404 of the forward extension 66 of the bit holder body 16, shown in FIG. 11, where a distal end 470 (FIG. 9) of the dowel pin 434 extends into the third bore section 418 of the bore 404. The bit cartridge 400 is rotatable throughout within the unitary bit/holder 14 after insertion into the bit holder 402. The dowel pin 434 radially aligns the bit cartridge 400, supports radial loading, improves bit cartridge rotation, extends axial length of bearing support, and allows the bit cartridge 400 body to be used regardless of whether the rotatable bit cartridge 400 was heat treated or not heat treated.

Figure 12:
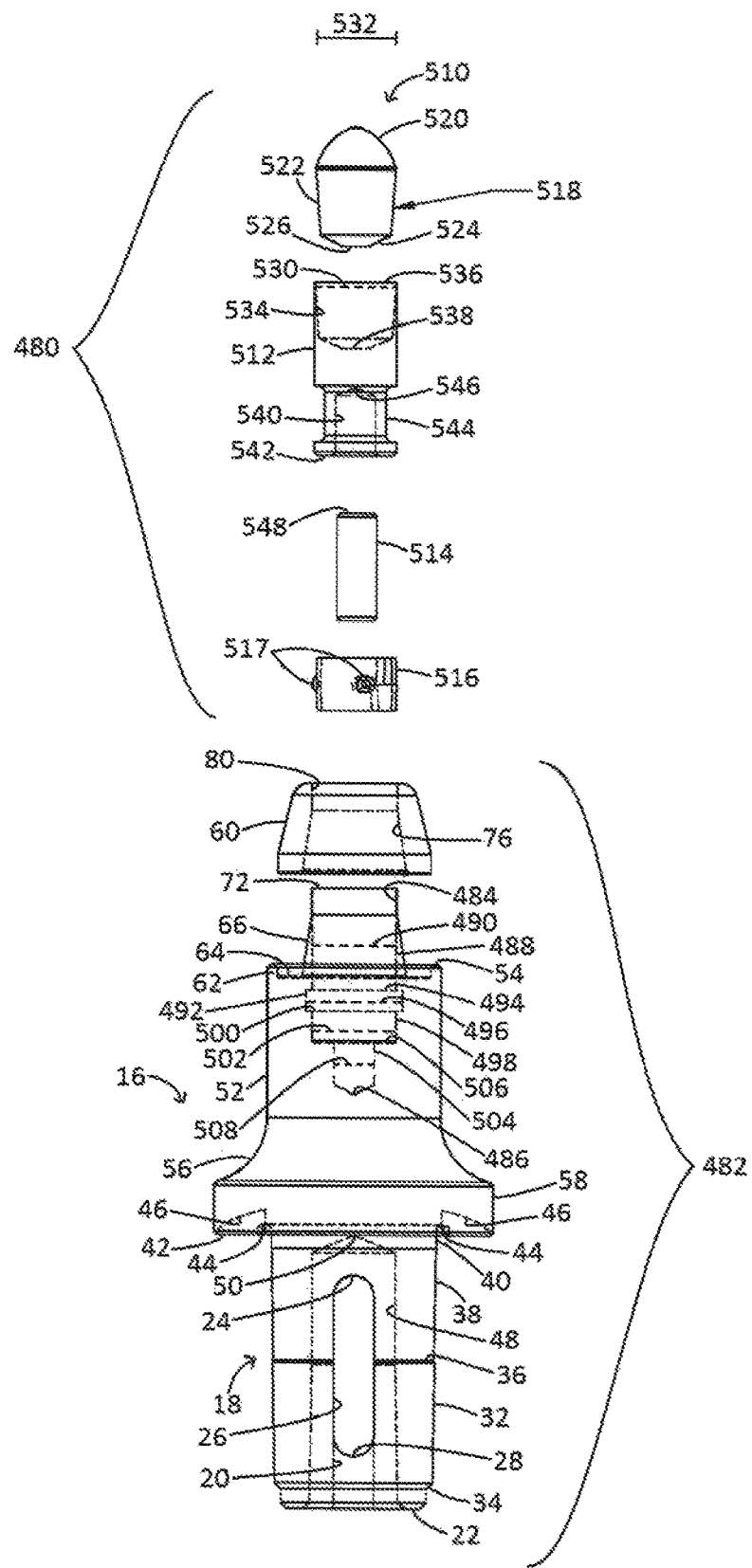
FIG. 12 is an exploded side view of a sixth embodiment of a unitary bit/holder and a fifth embodiment of the rotatable bit cartridge, showing invisible internal elements in dotted lines, in accordance with implementations of this disclosure.
Figures 13, 14:
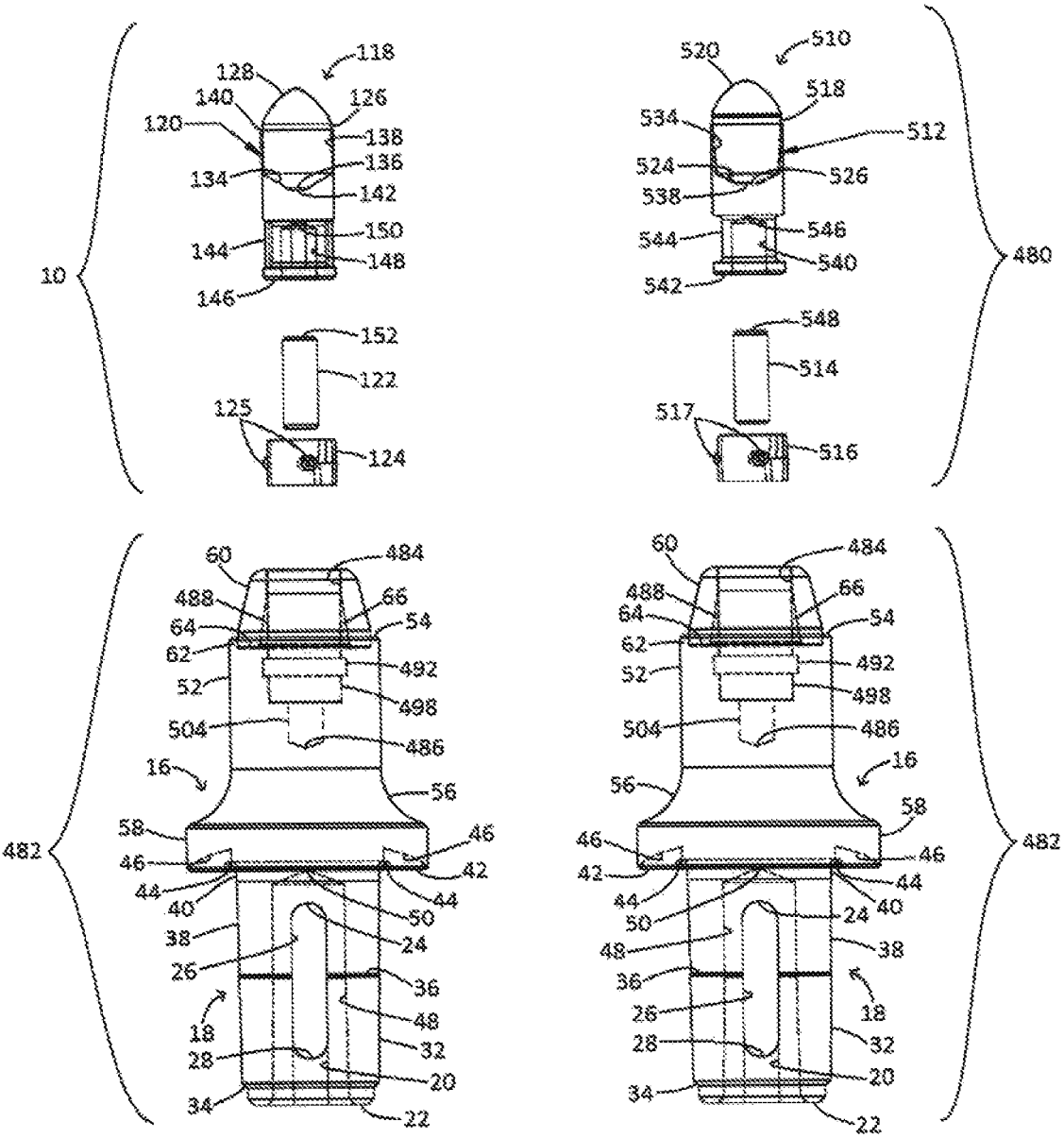
FIG. 13 is an exploded side view of the sixth embodiment of the unitary bit/holder and the first embodiment of the rotatable bit cartridge, showing a steel member assembled with a bit tip insert including a generally cylindrical bore sidewall and showing invisible internal elements in dotted lines, in accordance with implementations of this disclosure.
FIG. 14 is an exploded side view of the sixth embodiment of the unitary bit/holder and the second embodiment of the rotatable bit cartridge, showing a steel member assembled with a bit tip insert including a tapered bore sidewall and showing invisible internal elements in dotted lines, in accordance with implementations of this disclosure.

Referring to FIGS. 12 and 14, a fifth embodiment of a rotatable bit cartridge 480 is shown with a sixth embodiment of a bit holder, tool, and/or pick 482 of the present disclosure. The sixth embodiment of the bit holder 482 is substantially the same as the first embodiment of the bit holder 12 with an exception that a generally cylindrical bore 484 of the bit holder 482 has a different configuration than the generally cylindrical bore 74 of the bit holder 12 (FIG. 1). The generally cylindrical bore 484 of the bit holder 482 extends axially inwardly from the top of the forward extension 66 of the bit holder body 16. In other embodiments, the bore 484 can also have a tapered bore or a slight draw or draft angle. The bore 484 extends from the forward end 72 of the bit holder body 16 to a bore termination 486 within the upper body portion 52 adjacent the mediate body portion 56 of the bit holder body 16. In this exemplary implementation of bit holder 482, the bore termination 486 has a conical shape. The bore 484 comprises a plurality of bore sections that may be generally cylindrical, tapered, and/or arcuate and that include various diameters as it extends from the forward end 72 to the bore termination 486. A generally cylindrical first bore section 488 of the bore 484, which axially extends from the forward end 72 of the bit holder body 16 to a location adjacent the annular trough 64, has a first diameter 490. A generally cylindrical second bore section 492 of the bore 484, which axially extends from a distal end 494 of the first bore section 488, has a second diameter 496 that is greater than the first diameter 490. A generally cylindrical third bore section 498 of the bore 484, which axially extends from a distal end 500 of the second bore section 492, has a third diameter 502 that is approximately the first diameter 490 of the first bore section 488. A generally cylindrical fourth bore section 504 of the bore 484, which axially extends from a distal end 506 of the third bore section 498 to the bore termination 486, has a fourth diameter 508 that is less than the first diameter 490, the second diameter 496, and the third diameter 502.

The fifth embodiment of the bit cartridge 480 comprises a generally conical bit tip insert 510 (FIG. 12), a tungsten carbide or steel member 512, a tungsten carbide or hardened steel pin 514, and a dimpled wedding band style retainer 516. The bit tip insert 510 comprises a base 518 and a tip 520 adjacent the base 518 that includes a parabolic curved section below an apex of the bit tip insert 510. The base 518 and/or the distal end may also be planar in an alternate embodiment. This tip 520 can have a frustoconical shape, a flat generally cylindrical puck shape, a parabolic ballistic shape, a conical shape, and/or an arcuate shape. In this fifth embodiment, the base 518 includes a tapered sidewall 522 and a frustoconical portion 524 adjacent a distal end 526 of the bit tip insert 510. In alternate embodiments, the base 518 can include a generally cylindrical sidewall (not shown) and the frustoconical portion 524 adjacent the distal end 526 of the bit tip insert 510, the base 518 can include a generally cylindrical sidewall (not shown) and a planar distal end (not shown) without a frustoconical portion, and the base 518 can include a tapered sidewall 522 and a planar distal end (not shown) without a frustoconical portion. In one exemplary implementation of the fifth embodiment, the bit tip insert 510 can have a diameter in the range of ⅝ inch to 1¼ inches. The bit tip insert 510 may be a tungsten carbide insert or many be a tungsten carbide insert that includes an overlay 528 (not shown) of a polycrystalline diamond structure that is applied to an outer surface of the tip 520. The overlay 528 may be a single coating or outer layer or multiple coatings or outer layers of such industrial diamond material, natural diamond, polycrystalline diamond (PCD) material, and polycrystalline diamond composite or PCD material.

The member 512 comprises an outer diameter 530 that is approximately 0.030 inch, in this exemplary implementation, larger than an upper outer diameter 532 of the bit tip insert 510 and comprises a tapered first bore 534 that axially extends inwardly from a forward end 536 of the member 512 to a first bore termination 538, which provides a space for receiving the complementary shaped sidewall 522 and planar or frustoconical portion 524 of the base 518 of the bit tip insert 510. The diameter 530 of the member 512 may be machined to a finished size before or after the bit tip insert 510 is brazed into the first bore 534 of the member 512. The remaining wall of the member 512 adjacent the inner portion 80 of the tungsten carbide ring 60 will wear away in use, causing the top portion of the sidewall 522 of the tungsten carbide base 518 of the bit tip insert 510 to contact and be supported by the dowel pin 514 and the generally cylindrical or tapered (not shown) top inner portion 80 of the tungsten carbide ring 60.

The member 512 further comprises a generally cylindrical second bore 540 that axially extends inwardly from a distal end 542 of the member 512 through an annular groove 544 the member 512 adjacent the distal end 542 of the member 512 to a second bore termination 546, which in this embodiment has a conical shape. The second bore 540 provides a space for receiving a forward end 548 of the dowel pin 514. The annular groove 544 of the member 512 includes a smaller diameter than the rest of the member 512 and is configured to receive the retainer 516.

To assemble the rotatable bit cartridge 480, the member 512 is manufactured and the base 518 of the bit tip insert 510 is brazed in the first bore 534 of the member 512 creating a high strength braze joint, which may then be optionally hardened, before or after brazing the bit tip insert 510 in the first bore 534. The forward end 548 of the pin 514 may be press fitted into the second bore 540 of the member 512 and the retainer 516 is assembled around the annular groove 544 of the member 512. Optionally, a lubricating agent, such as graphite powder, graphene, granular lubricating powder, or the equivalent of any of the foregoing, is added to all components of the rotatable bit cartridge 480, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 in a separate brazing step, operation, or process. The bit holder 482 may then be heat treated. Alternatively, the bit holder 482 may be heat treated and the body 16 machined, if necessary, to accept the ring 60, and then the ring 60 is positioned around the forward extension 66 and brazed in the annular trough 64 of the bit holder body 16 in a separate brazing step, operation, or process. To assemble the unitary bit/holder 14 comprising the fifth embodiment of the rotatable bit cartridge 480 and the sixth embodiment of the bit holder 482, the assembled rotatable bit cartridge 480 is inserted into the bore 484 of the forward extension 66 of the bit holder body 16. The bit cartridge 480 is rotatable throughout within the unitary bit/holder 14 after insertion into the bit holder 482. The dowel pin 514 radially aligns the bit cartridge 480, supports radial loading, improves bit cartridge rotation, extends axial length of bearing support, and allows the bit cartridge 480 body to be used whether the rotatable bit cartridge 480 was heat treated or not heat treated.

Referring to FIG. 13, the first embodiment of a rotatable bit cartridge 10 (FIG. 1-3) is shown with the sixth embodiment of the bit holder 482 (FIG. 12) of the present disclosure. To assemble the rotatable bit cartridge 10, the member 120 (FIG. 1) is manufactured and the base 126 of the bit tip insert 118 is brazed in the first bore 138 of the member 120 creating a high strength braze joint, which may then be optionally hardened before or after brazing the bit tip insert 118 in the first bore 138. The forward end 152 of the pin 122 may be press fitted into the second bore 148 of the member 120 and the retainer 124 is assembled around the annular groove 144 of the member 120. Optionally, a lubricating agent, such as graphite powder, graphene, granular lubricating powder, or the equivalent of any of the foregoing, is added to all components of the rotatable bit cartridge 10, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 in a separate brazing step, operation, or process. The bit holder 482 may then be heat treated. Alternatively, the bit holder 482 may be heat treated and the body 16 machined, if necessary, to accept the ring 60, and then the ring 60 is positioned around the forward extension 66 and brazed in the annular trough 64 of the bit holder body 16 in a separate brazing step, operation, or process. To assemble the unitary bit/holder 14 comprising the first embodiment of the rotatable bit cartridge 10 and the sixth embodiment of the bit holder 482, the assembled rotatable bit cartridge 10 is inserted into the bore 484 of the forward extension 66 of the bit holder body 16. The bit cartridge 10 is rotatable throughout within the unitary bit/holder 14 after insertion into the bit holder 482. The dowel pin 122 radially aligns the bit cartridge 10, supports radial loading, improves bit cartridge rotation, extends axial length of bearing support, and allows the bit cartridge 10 body to be used whether the rotatable bit cartridge 10 was heat treated or not heat treated.

Referring to FIG. 14, the fifth embodiment of a rotatable bit cartridge 510 (FIG. 12) is shown with the sixth embodiment of the bit holder 482 (FIG. 12) of the present disclosure. To assemble the rotatable bit cartridge 510, the member 512 is manufactured and the base 518 of the bit tip insert 510 is brazed in the first bore 534 of the member 512 creating a high strength braze joint, which may then be optionally hardened before or after brazing the bit tip insert 510 in the first bore 534. The forward end 548 of the pin 514 may be press fitted into the second bore 540 of the member 512 and the retainer 516 is assembled around the annular groove 544 of the member 512. Optionally, a lubricating agent, such as graphite powder, graphene, granular lubricating powder, or the equivalent of any of the foregoing, is added to all components of the rotatable bit cartridge 510, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 in a separate brazing step, operation, or process. The bit holder 482 may then be heat treated. Alternatively, the bit holder 482 may be heat treated and the body 16 machined, if necessary, to accept the ring 60, and then the ring 60 is positioned around the forward extension 66 and brazed in the annular trough 64 of the bit holder body 16 in a separate brazing step, operation, or process. To assemble the unitary bit/holder 14 comprising the fifth embodiment of the rotatable bit cartridge 510 and the sixth embodiment of the bit holder 482, the assembled rotatable bit cartridge 510 is inserted into the bore 484 of the forward extension 66 of the bit holder body 16. The bit cartridge 510 is rotatable throughout within the unitary bit/holder 14 after insertion into the bit holder 482. The dowel pin 514 radially aligns the bit cartridge 510, supports radial loading, improves bit cartridge rotation, extends axial length of bearing support, and allows the bit cartridge 510 body to be used whether the rotatable bit cartridge 510 was heat treated or not heat treated.

Figure 15:
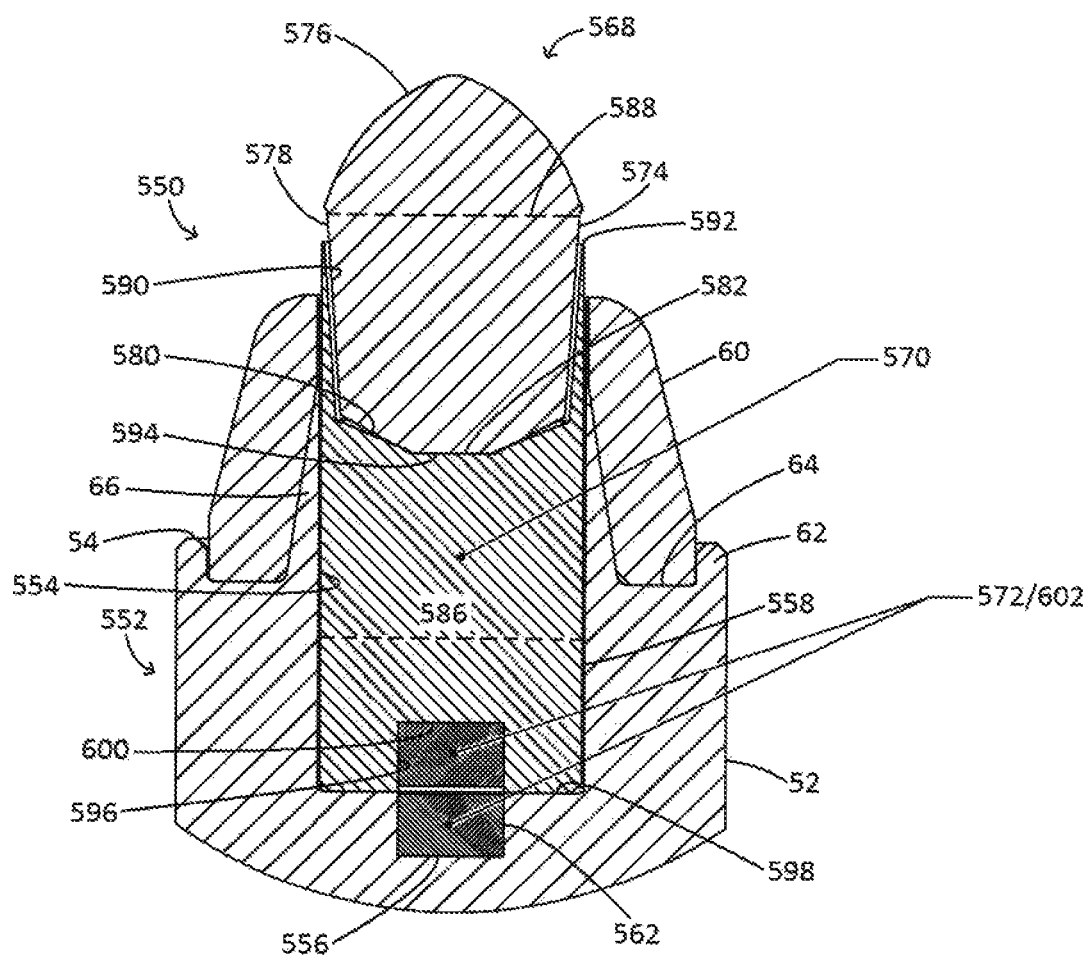
FIG. 15 is a detail cross-sectional view of a seventh embodiment of a unitary bit/holder and a sixth embodiment of a rotatable bit cartridge assembled in the unitary bit/holder in accordance with implementations of this disclosure.
Figure 22:
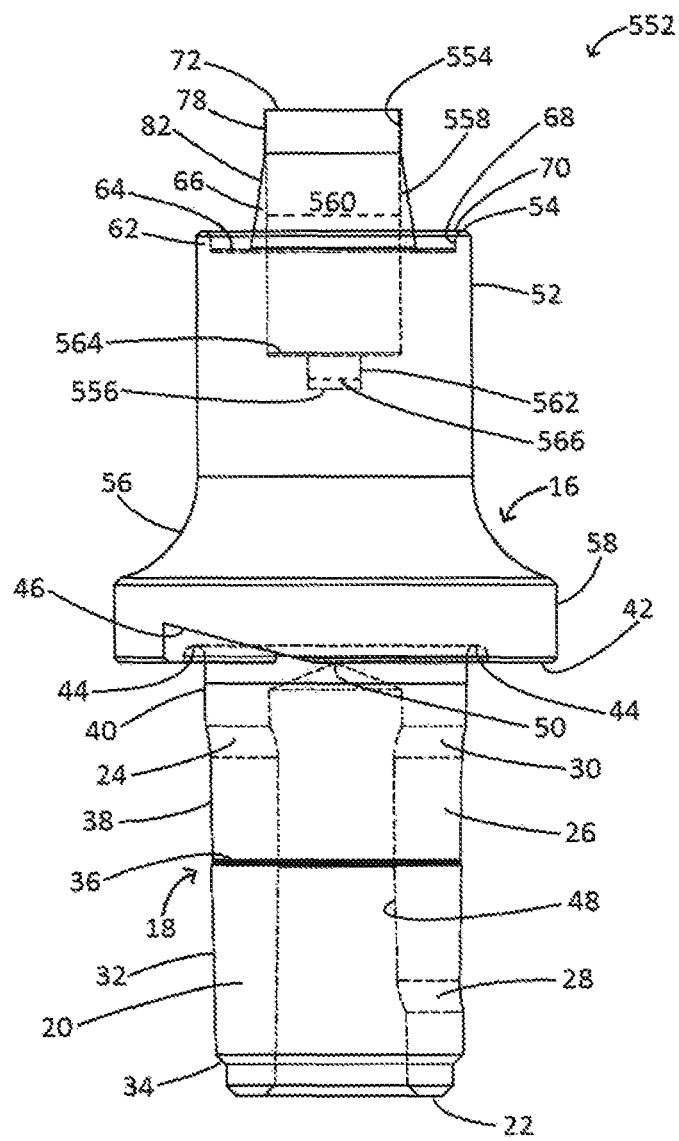
FIG. 22 is a side elevation view of the seventh embodiment of the unitary bit/holder of FIG. 15, showing invisible internal elements in dotted lines, in accordance with implementations of this disclosure.

Referring to FIGS. 15 and 22, a sixth embodiment of a rotatable bit cartridge 550 (FIG. 15) is shown in detail in a seventh embodiment of a bit holder, tool, and/or pick 552 (FIGS. 15 and 22) of the present disclosure. The seventh embodiment of the bit holder 552 is substantially the same as the first embodiment of the bit holder 12 with an exception that a generally cylindrical bore 554 of the bit holder 552 has a different configuration than the generally cylindrical bore 74 of the bit holder 12 (FIG. 1). The generally cylindrical bore 554 of the bit holder 552 extends axially inwardly from the top of the forward extension 66 of the bit holder body 16, as shown in FIG. 22. In other embodiments, the bore 554 can also have a tapered bore or a slight draw or draft angle. The bore 554 extends from the forward end 72 of the bit holder body 16 to a bore termination 556 within the upper body portion 52 adjacent the mediate body portion 56 of the bit holder body 16. The bore 554 comprises a plurality of bore sections that may be generally cylindrical, tapered, and/or arcuate and that include various diameters as it extends from the forward end 72 to the bore termination 556, as shown in FIG. 22. A generally cylindrical first bore section 558 of the bore 554, which axially extends from the forward end 72 of the bit holder body 16 to a location adjacent the annular trough 64, has a first diameter 560. A generally cylindrical second bore section 562 of the bore 554, which axially extends from a distal end 564 of the first bore section 558 to the bore termination 556, has a second diameter 566 that is less than the first diameter 560.

The sixth embodiment of the bit cartridge 550 comprises a generally conical bit tip insert 568 (FIG. 15), a tungsten carbide or steel member 570, and a magnet 572. The bit tip insert 568 comprises a base 574 and a tip 576 adjacent the base 574 that includes a parabolic curved section below an apex of the bit tip insert 568. The base 574 and/or the distal end may also be planar in an alternate embodiment. This tip 576 can have a frustoconical shape, a flat generally cylindrical puck shape, a parabolic ballistic shape, a conical shape, and/or an arcuate shape. In this sixth embodiment, the base 574 includes a tapered sidewall 578 and a frustoconical portion 580 adjacent a distal end 582 of the bit tip insert 568. In alternate embodiments, the base 574 can include a generally cylindrical sidewall (not shown) and the frustoconical portion 580 adjacent the distal end 582 of the bit tip insert 568, the base 574 can include a generally cylindrical sidewall (not shown) and a planar distal end (not shown) without a frustoconical portion, and the base 574 can include a tapered sidewall 578 and a planar distal end (not shown) without a frustoconical portion. In one exemplary implementation of the sixth embodiment, the bit tip insert 568 can have a diameter in the range of ⅝ inch to 1¼ inches. The bit tip insert 568 may be a tungsten carbide insert or may be a tungsten carbide insert that includes an overlay 584 (not shown) of a polycrystalline diamond structure that is applied to an outer surface of the tip 576. The overlay 584 may be a single coating or outer layer or multiple coatings or outer layers of such industrial diamond material, natural diamond, polycrystalline diamond (PCD) material, and polycrystalline diamond composite PCD material.

The member 570 comprises an outer diameter 586 that is approximately 0.030 inch, in this exemplary implementation, larger than an upper outer diameter 588 of the bit tip insert 568 and comprises a tapered first bore 590 that axially extends inwardly from a forward end 592 of the member 570 to a first bore termination 594, which provides a space for receiving the complementary shaped sidewall 578 and planar or frustoconical portion 580 of the base 574 of the bit tip insert 568. The diameter 586 of the member 570 may be machined to a finished size before or after the bit tip insert 568 is brazed into the first bore 590 of the member 570. The remaining wall of the member 570 adjacent the inner portion 80 of the tungsten carbide ring 60 will wear away in use, causing the top portion of the sidewall 578 of the tungsten carbide base 574 of the bit tip insert 568 to contact and be supported by the generally cylindrical or tapered (not shown) top inner portion 80 of the tungsten carbide ring 60. The member 570 further comprises a generally cylindrical second bore 596 that axially extends inwardly from a distal end 598 of the member 570 to a second bore termination 600. The second bore 596 provides a space for receiving the magnet 572.

To assemble the rotatable bit cartridge 550, the member 570 is manufactured and the base 574 of the bit tip insert 568 is brazed in the first bore 590 of the member 570 creating a high strength braze joint, which may then be optionally hardened before or after brazing the bit tip insert 568 in the first bore 590. The magnet 572 is then pressed, epoxied, or fitted into the second bore 596 of the member 570. Optionally, a lubricating agent, such as graphite powder, graphene, granular lubricating powder, or the equivalent of any of the foregoing, is added to all components of the rotatable bit cartridge 550, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 in a separate brazing step, operation, or process. The bit holder 552 may then be heat treated. Alternatively, the bit holder 552 may be heat treated and the body 16 machined, if necessary, to accept the ring 60, and then the ring 60 is positioned around the forward extension 66 and brazed in the annular trough 64 of the bit holder body 16 in a separate brazing step, operation, or process. A magnet 602 is then mounted into the second bore section 562 of the bore 554. To assemble the unitary bit/holder 14 comprising the sixth embodiment of the rotatable bit cartridge 550 and the seventh embodiment of the bit holder 552, the assembled rotatable bit cartridge 550 is inserted into the bore 554 of the forward extension 66 of the bit holder body 16, such that the distal end 598 of the member 570 contacts the bore termination 556. The bit cartridge 550 is rotatable throughout within the unitary bit/holder 14 after insertion into the bit holder 552. The magnet 572 of the rotatable bit cartridge 550 is adjacent to the magnet 602 of the bit holder 552 and together provide additional holding power between the rotatable bit cartridge 550 and the bit holder 552 while still allowing the bit cartridge 550 to be rotatable throughout within the bore 554 of the bit holder 552.

Figure 16:
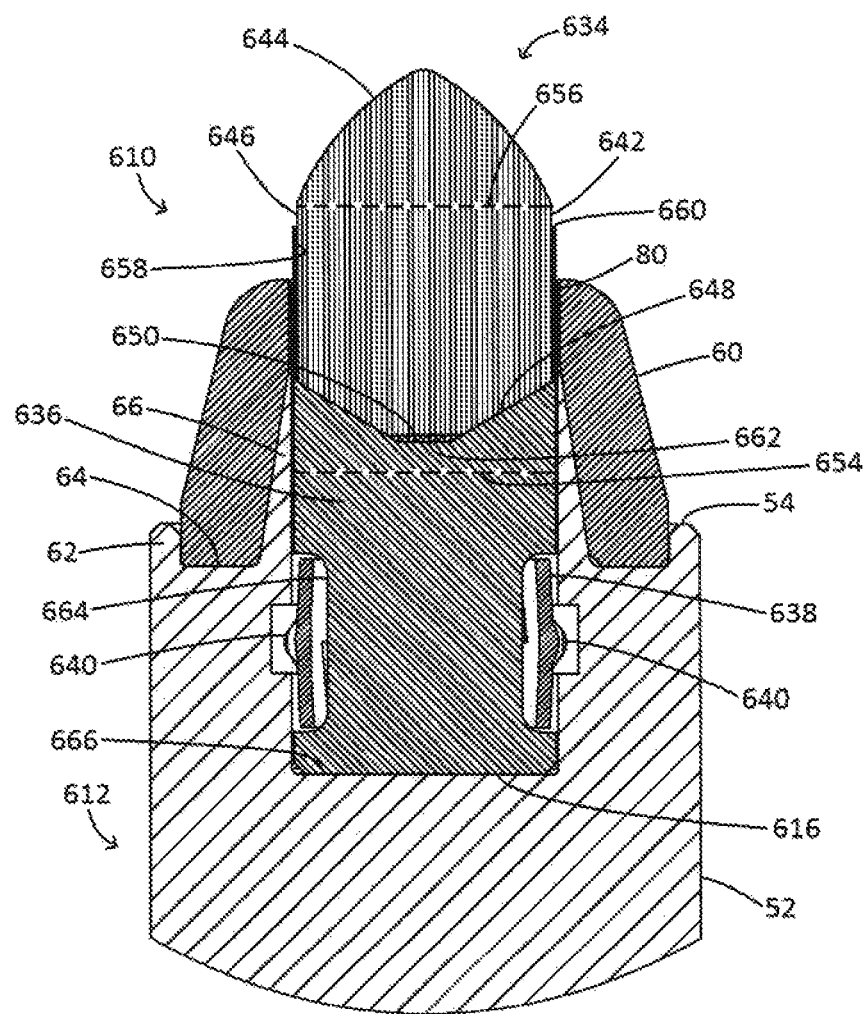
FIG. 16 is a detail cross-sectional view of an eighth embodiment of a unitary bit/holder and a seventh embodiment of a rotatable bit cartridge assembled in the unitary bit/holder in accordance with implementations of this disclosure.
Figure 23:
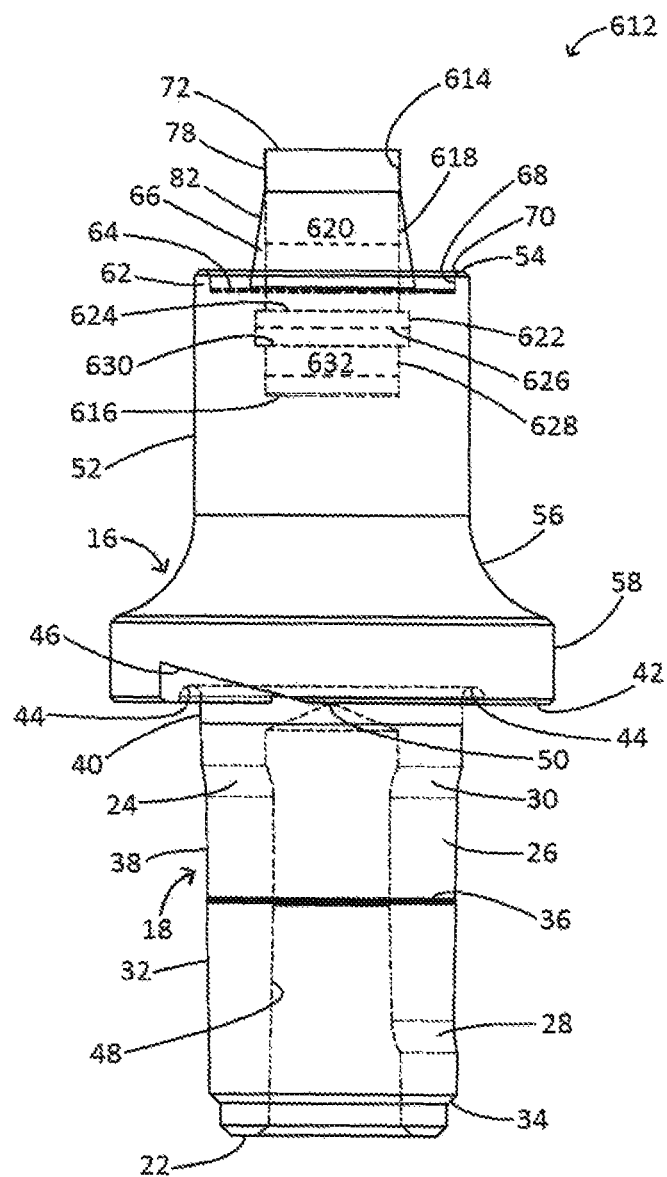
FIG. 23 is a side elevation view of the eighth embodiment of the unitary bit/holder of FIG. 16, showing invisible internal elements in dotted lines, in accordance with implementations of this disclosure.

Referring to FIGS. 16 and 23, a seventh embodiment of a rotatable bit cartridge 610 (FIG. 16) is shown in detail in an eighth embodiment of a bit holder, tool, and/or pick 612 (FIGS. 16 and 23) of the present disclosure. The eighth embodiment of the bit holder 612 is substantially the same as the first embodiment of the bit holder 12 with an exception that a generally cylindrical bore 614 of the bit holder 612 has a different configuration than the generally cylindrical bore 74 of the bit holder 12 (FIG. 1). The generally cylindrical bore 614 of the bit holder 612 extends axially inwardly from the top of the forward extension 66 of the bit holder body 16. In other embodiments, the bore 614 can also have a tapered bore or a slight draw or draft angle. The bore 614 extends from the forward end 72 of the bit holder body 16 to a bore termination 616 within the upper body portion 52 adjacent the mediate body portion 56 of the bit holder body 16. The bore 614 comprises a plurality of bore sections that may be generally cylindrical, tapered, and/or arcuate and that include various diameters as it extends from the forward end 72 to the bore termination 616, as shown in FIG. 23. A generally cylindrical first bore section 618 of the bore 614, which axially extends from the forward end 72 of the bit holder body 16 to a location adjacent the annular trough 64, has a first diameter 620. A generally cylindrical second bore section 622 of the bore 614, which axially extends from a distal end 624 of the first bore section 618, has a second diameter 626 that is greater than the first diameter 620. A generally cylindrical third bore section 628 of the bore 614, which axially extends from a distal end 630 of the second bore section 622 to the bore termination 616, has a third diameter 632 that is approximately the first diameter 620 of the first bore section 618 and less than the second diameter 626 of the second section 622.

The seventh embodiment of the bit cartridge 610 comprises a generally conical bit tip insert 634, a steel or tungsten carbide member 636, and a dimpled wedding band style retainer 638 that includes at least one dimple 640 on the outer surface of the retainer 638. The bit tip insert 634 comprises a base 642 and a tip 644 adjacent the base 642 that includes a parabolic curved section below an apex of the bit tip insert 634. The base 642 and/or the distal end may also be planar in an alternate embodiment. This tip 644 can have a frustoconical shape, a flat generally cylindrical puck shape, a parabolic ballistic shape, a conical shape, and/or an arcuate shape. In this seventh embodiment, the base 642 includes a generally cylindrical sidewall 646 and a frustoconical portion 648 adjacent a distal end 650 of the bit tip insert 634. In alternate embodiments, the base 642 can include a tapered sidewall (not shown) and the frustoconical portion 648 adjacent the distal end 650 of the bit tip insert 634, the base 646 can include a generally cylindrical sidewall 646 and a planar distal end (not shown) without a frustoconical portion, and the base 646 can include a tapered sidewall (not shown) and a planar distal end (not shown) without a frustoconical portion. In one exemplary implementation of the seventh embodiment, the bit tip insert 634 can have a diameter in the range of ⅝ inch to 1¼ inches. The bit tip insert 634 may be a tungsten carbide insert or may be a tungsten carbide insert that includes an overlay 652 (not shown) of a polycrystalline diamond structure that is applied to an outer surface of the tip 644. The overlay 652 may be a single coating or outer layer or multiple coatings or outer layers of such industrial diamond material, natural diamond, polycrystalline diamond (PCD) material, and polycrystalline diamond composite or PCD material.

The member 636 comprises an outer diameter 654 that is approximately 0.030 inch, in this exemplary implementation, larger than an upper outer diameter 656 of the bit tip insert 634 and comprises a generally cylindrical bore 658 that axially extends inwardly from a forward end 660 of the member 636 to a bore termination 662, which provides a space for receiving the complementary shaped sidewall 646 and planar or frustoconical portion 648 of the base 642 of the bit tip insert 634. The diameter 654 of the member 636 may be machined to a finished size before or after the bit tip insert 634 is brazed into the bore 658 of the tungsten carbide or steel member 636. The remaining wall of the member 636 adjacent the inner portion 80 of the tungsten carbide ring 60 will wear away in use, causing the top portion of the sidewall 646 of the tungsten carbide base 642 of the bit tip insert 634 to contact and be supported by the generally cylindrical or tapered (not shown) top inner portion 80 of the tungsten carbide ring 60. An annular groove 664 of the member 636 adjacent a distal end 666 of the member 636 includes approximately the same diameter as the rest of the member 636 and is configured to receive the retainer 638.

To assemble the rotatable bit cartridge 610, the member 636 is manufactured and the base 642 of the bit tip insert 634 is brazed in the bore 658 of the member 636 creating a high strength braze joint, which may then be optionally hardened before or after brazing the bit tip insert 634 in the bore 658. The retainer 638 is then assembled around the annular groove 664 of the member 636. Optionally, a lubricating agent, such as graphite powder, graphene, granular lubricating powder, or the equivalent of any of the foregoing, is added to all components of the rotatable bit cartridge 610, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 in a separate brazing step, operation, or process. The bit holder 612 may then be heat treated. Alternatively, the bit holder 612 may be heat treated and the body 16 machined, if necessary, to accept the ring 60, and then the ring 60 is positioned around the forward extension 66 and brazed in the annular trough 64 of the bit holder body 16 in a separate brazing step, operation, or process. To assemble the unitary bit/holder 14 comprising the seventh embodiment of the rotatable bit cartridge 610 and the eighth embodiment of the bit holder 612, the assembled rotatable bit cartridge 610 is inserted into the bore 614 of the forward extension 66 of the bit holder body 16, such that the distal end 666 of the member 636 contacts the bore termination 616. The bit cartridge 610 is rotatable throughout within the unitary bit/holder 14 after insertion into the bit holder 612. The bit cartridge 610 is able to rotate within the bore 614 of the bit holder 612 after assembly into the unitary bit/holder 14.

Figure 17:
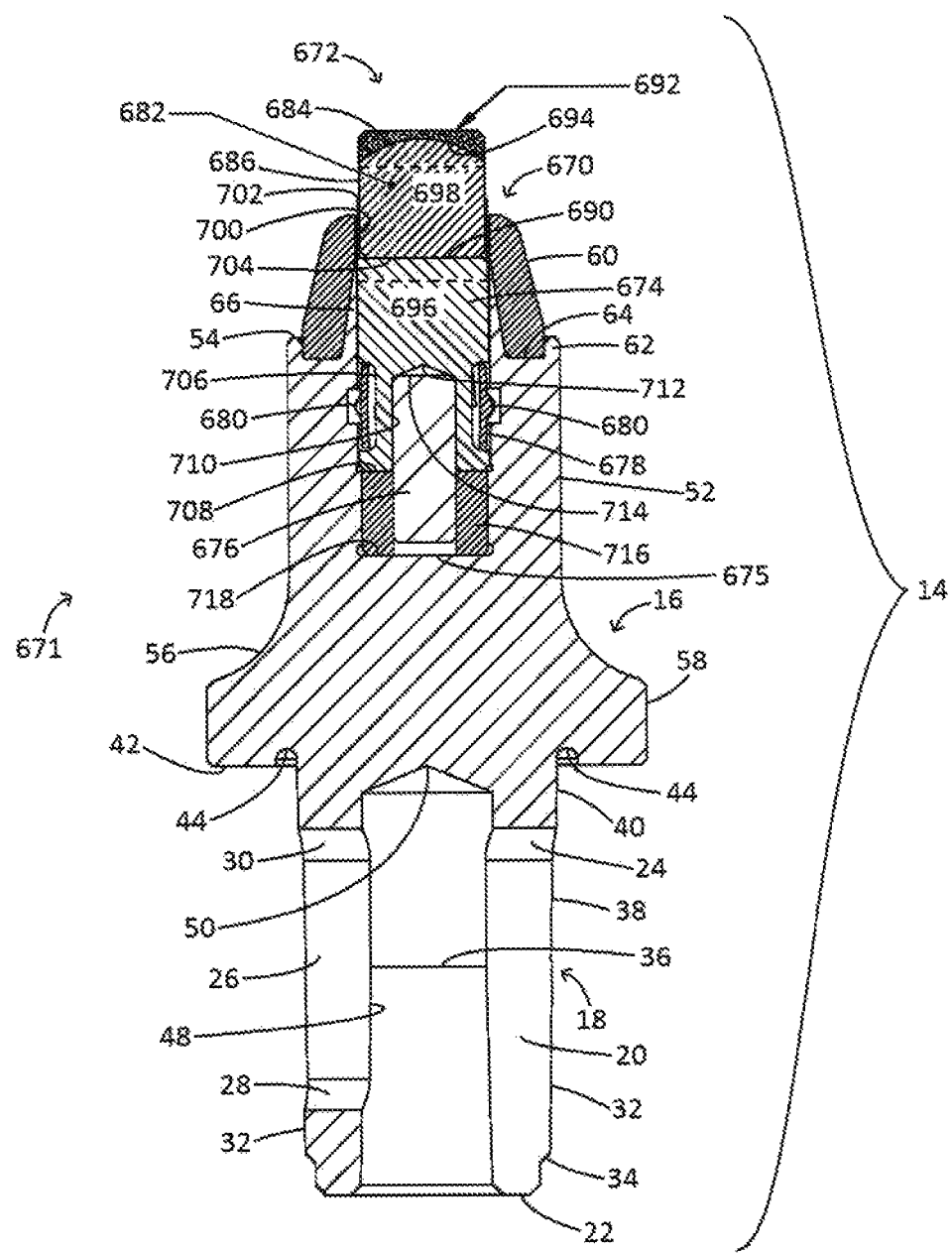
FIG. 17 is a cross-sectional view of a ninth embodiment of the unitary bit/holder and an eighth embodiment of a rotatable bit cartridge assembled in the unitary bit/holder in accordance with implementations of this disclosure.
Figure 21:
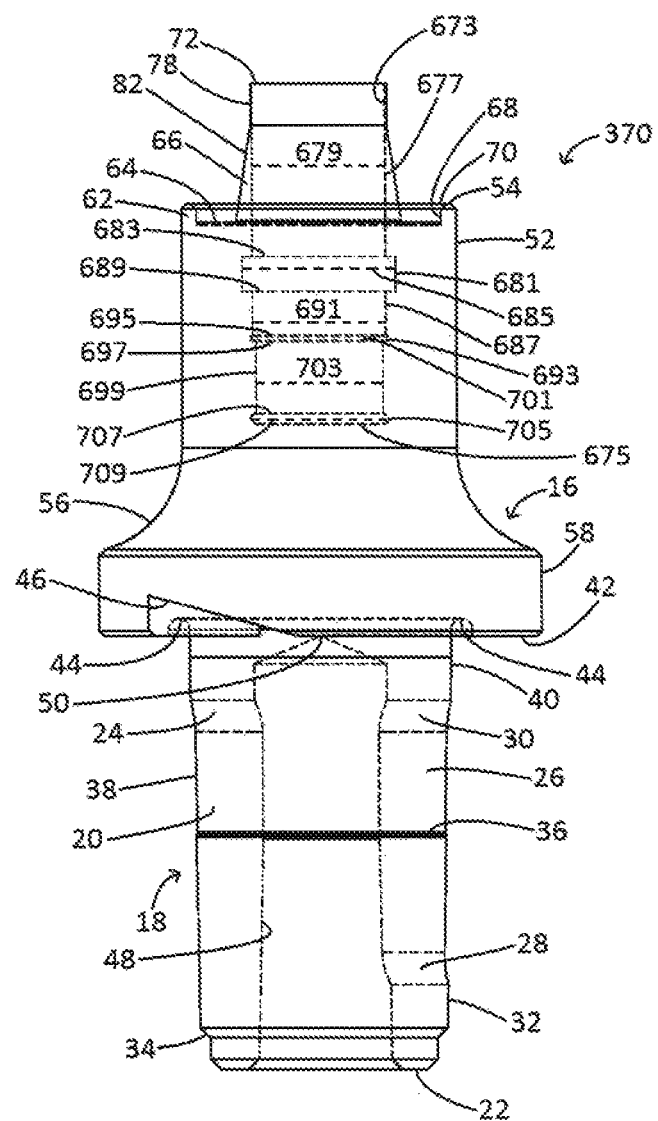
FIG. 21 is a side elevation view of the ninth embodiment of the unitary bit/holder of FIG. 17, showing invisible internal elements in dotted lines, in accordance with implementations of this disclosure.

Referring to FIGS. 17 and 21, an eighth embodiment of a rotatable bit cartridge 670 (FIG. 17) is shown in detail in a ninth embodiment of the bit holder 671 (FIGS. 17 and 21) of the present invention. The ninth embodiment of the bit holder 671 is substantially the same as the first embodiment of the bit holder 12 with an exception that a generally cylindrical bore 673 (FIG. 21) of the bit holder 671 has a different configuration than the generally cylindrical bore 74 of the bit holder 12 (FIG. 1). The generally cylindrical bore 673 of the bit holder 671 extends axially inwardly from the top of the forward extension 66 of the bit holder body 16. In other embodiments, the bore 673 can also have a tapered bore or a slight draw or draft angle. The bore 673 extends from the forward end 72 of the bit holder body 16 to a bore termination 675 within the upper body portion 52 (FIG. 21) adjacent the mediate body portion 56 of the bit holder body 16. The bore 673 comprises a plurality of bore sections that may be generally cylindrical, tapered, and/or arcuate and that include various diameters as it extends from the forward end 72 to the bore termination 675, as shown in FIG. 21. A generally cylindrical first bore section 677 of the bore 673, which axially extends from the forward end 72 of the bit holder body 16 to a location adjacent the annular trough 64, has a first diameter 679. A generally cylindrical second bore section 681 of the bore 673, which axially extends from a distal end 683 of the first bore section 677, has a second diameter 685 that is greater than the first diameter 679. A generally cylindrical third bore section 687 of the bore 673, which axially extends from a distal end 689 of the second bore section 681, has a third diameter 632 that is approximately the first diameter 679 of the first bore section 677 and less than the second diameter 685 of the second bore section 681. An arcuate fourth bore section 693, which axially extends from a distal end 695 of the third bore section 687, has a fourth diameter 697 that is greater than the first diameter 679 and the third diameter 691 and less than the second diameter 685. A generally cylindrical fifth bore section 699, which axially extends from a distal end 701 of the fourth bore section 693, has a fifth diameter 708 that is approximately the same as the first diameter 679 and the third diameter 691 and less than the second diameter 685 and the fourth diameter 697. An arcuate sixth bore section 705, which axially extends from a distal end 707 of the fifth bore section 699 to the bore termination 675, has a sixth diameter 709 that is approximately the same as the fourth diameter 697, larger than the first diameter 679, the third diameter 691, and the fifth diameter 703, and smaller than the second diameter 685. In this exemplary implementation of the ninth embodiment, the fourth bore section 693 and the sixth bore section 705 have arcuate sidewalls.

The eighth embodiment of the bit cartridge 670 comprises a generally flat bit tip insert 672, a steel or tungsten carbide member 674, a tungsten carbide or hardened steel pin 676, and a dimpled wedding band style retainer 678 that includes at least one dimple 680 on the outer surface of the retainer 678. The bit tip insert 672 comprises a base 682 and a tip 684 adjacent the base 682 that includes a curved section below an apex of the bit tip insert 672. This tip 684 can have a frustoconical shape, a flat generally cylindrical puck shape, a parabolic ballistic shape, a conical shape, and/or an arcuate shape. In this seventh embodiment, the base 682 includes a generally cylindrical sidewall 686 and a flat distal end 690 of the bit tip insert 672. In alternate embodiments, the base 682 can include a tapered sidewall (not shown) adjacent the flat distal end 690 of the bit tip insert 672, the base 682 can include a generally cylindrical sidewall 686, a planar distal end 690 and a frustoconical portion (not shown), and the base 682 can include a tapered sidewall (not shown), a planar distal end 690 and a frustoconical portion (not shown). In one exemplary implementation of the eighth embodiment, the bit tip insert 672 can have a diameter in the range of ⅝ inch to 1¼ inches. The bit tip insert 672 includes a diamond table overlay 692 of a polycrystalline diamond structure that is applied to an outer surface of the tip 684. The interface 694 of the overlay 692 adjacent the outer surface of the tip 684 may have a planar, slightly convex, or slightly concave shape. The overlay 692 may be a single coating or outer layer or multiple coatings or outer layers of such industrial diamond material, natural diamond, polycrystalline diamond (PCD) material, and polycrystalline diamond composite or PCD material.

The member 674 comprises an outer diameter 696 that is approximately 0.030 inch, in this exemplary implementation, larger than an outer diameter 698 of the bit tip insert 672 and comprises a generally cylindrical first bore 700 that axially extends inwardly from a forward end 702 of the member 674 to a first bore termination 704, which provides a space for receiving the complementary shaped sidewall 686 and planar or frustoconical portion 688 of the base 682 of the bit tip insert 672. The diameter 696 of the member 674 is finished to size before the bit tip insert 672 are brazed at the same time into the first bore 700 of the member 674. The remaining wall of the member 674 adjacent the inner portion 80 of the tungsten carbide ring 60 will wear away in use, causing the top portion of the sidewall 686 of the tungsten carbide base 682 of the bit tip insert 672 to contact and be supported by the dowel pin 676 and the generally cylindrical or tapered (not shown) top inner portion 80 of the tungsten carbide ring 60.

The member 674 further comprises a generally cylindrical second bore 710 that axially extends inwardly from a distal end 708 of the member 674 through an annular groove 706 of the member 674 adjacent a distal end 708 of the member 674 to a second bore termination 712. The second bore 710 provides a space for receiving a forward end 714 of the dowel pin 676, which may be press fitted into the second bore 710. The annular groove 706 of the member 674 includes a smaller diameter than the rest of the member 674 and is configured to receive the retainer 678.

To assemble the rotatable bit cartridge 670, the member 674 is manufactured and the base 682 of the bit tip insert 672 is brazed in the first bore 700 of the member 670 creating a high strength braze joint, which may then be optionally hardened before or after brazing the bit tip insert 672 in the first bore 700. The forward end 714 of the pin 676 is then pressed into the second bore 710 of the member 674 and the retainer 678 is assembled around the annular groove 706 of the member 670. Optionally, a lubricating agent, such as graphite powder, graphene, granular lubricating powder, or the equivalent of any of the foregoing, is added to all components of the rotatable bit cartridge 670, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 during another brazing step, operation, or process. The bit holder 671 may then be heat treated. Alternatively, the bit holder 671 may be heat treated and the body 16 machined, if necessary, to accept the ring 60, and then the ring 60 is positioned around the forward extension 66 and brazed in the annular trough 64 of the bit holder body 16 in a separate brazing step, operation, or process. To assemble the unitary bit/holder 14 comprising the eighth embodiment of the rotatable bit cartridge 670 and the ninth embodiment of the bit holder 671, a tungsten carbide or hardened steel bushing 716 (FIG. 17) is assembled into the fifth section 699 of bore 673, such that the distal end 718 of the bushing 716 contacts the bore termination 675 and the assembled rotatable bit cartridge 670 is inserted into the bore 673 of the forward extension 66 of the bit holder body 16. The bit cartridge 670 is rotatable throughout within the unitary bit/holder 14 after insertion into the bit holder 671. The dowel pin 676 radially aligns the bit cartridge 670, supports radial loading, improves bit cartridge rotation, extends axial length of bearing support, and allows the bit cartridge 670 body to be used whether the rotatable bit cartridge 670 was heat treated or not heat treated.

Figure 18:
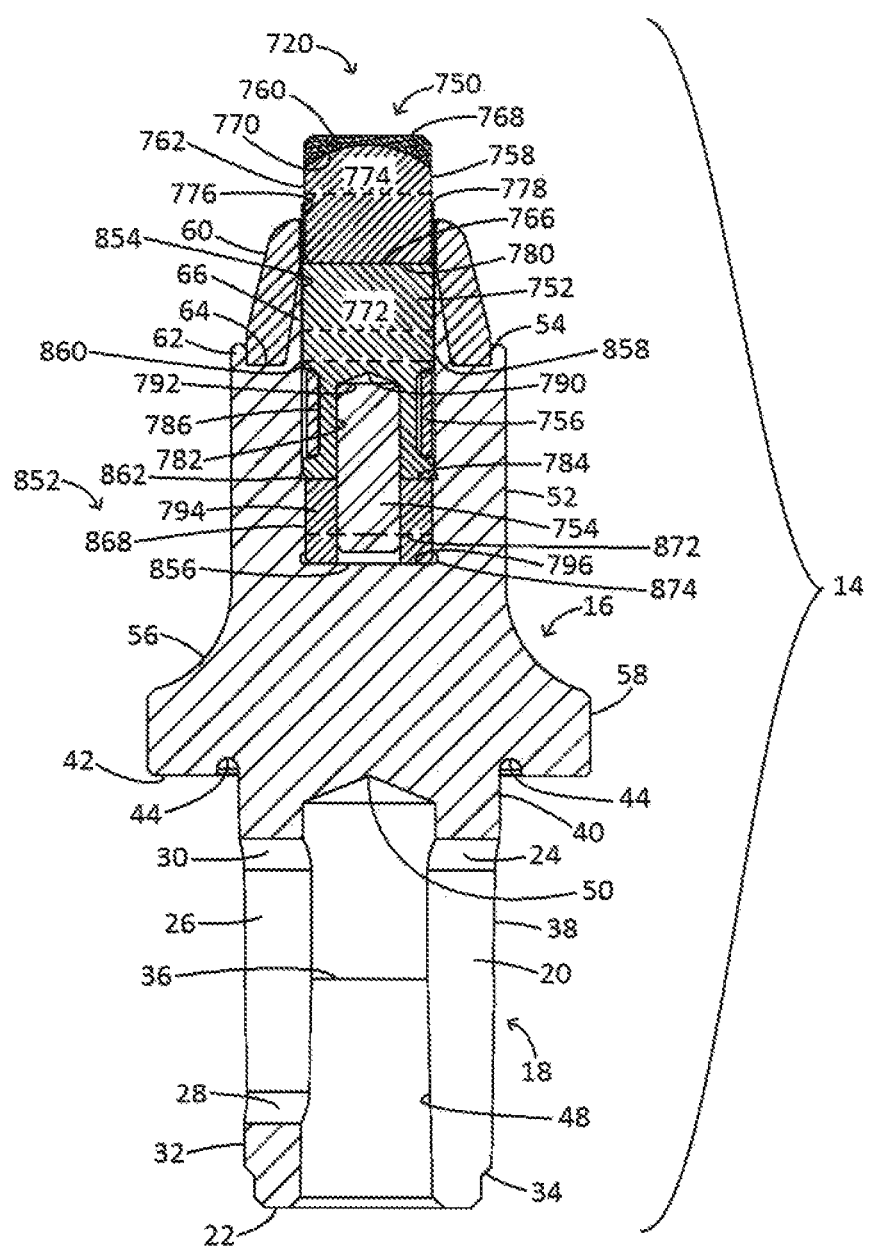
FIG. 18 is a cross-sectional view of a tenth embodiment of a unitary bit/holder and a ninth embodiment of a rotatable bit cartridge assembled in the unitary bit/holder in accordance with implementations of this disclosure.

Referring to FIG. 18, a ninth embodiment of a rotatable bit cartridge 720 is shown in a tenth embodiment of a bit holder, tool, and/or pick 852 of the present disclosure. The tenth embodiment of the bit holder 852 is substantially the same as the first embodiment of the bit holder 12 with an exception that a generally cylindrical bore 854 of the bit holder 852 has a different configuration than the generally cylindrical bore 74 of the bit holder 12 (FIG. 1). The generally cylindrical bore 854 of the bit holder 854 extends axially inwardly from the top of the forward extension 66 of the bit holder body 16. In other embodiments, the bore 854 can also have a tapered bore or a slight draw or draft angle. The bore 854 extends from the forward end 72 of the bit holder body 16 to a bore termination 856 within the upper body portion 52 adjacent the mediate body portion 56 of the bit holder body 16. The bore 854 comprises a plurality of bore sections that may be generally cylindrical, tapered, and/or arcuate and that include various diameters as it extends from the forward end 72 to the bore termination 856. A generally cylindrical first bore section 858 of the bore 854, which axially extends from the forward end 72 of the bit holder body 16 to a location approximately mid upper body portion 52 in this exemplary implementation, has a first diameter 860. An arcuate second bore section 862 of the bore 854, which axially extends from a distal end 864 (not shown) of the first bore section 858, has a second diameter 866 (not shown) that is greater than the first diameter 860. A generally cylindrical third bore section 868 of the bore 854, which axially extends from a distal end 870 (not shown) of the second bore section 862, has a third diameter 872 that is approximately the first diameter 860 of the first bore section 858 and less than the second diameter 866 of the second bore section 862. A generally cylindrical fourth bore section 874, which axially extends from a distal end 876 (not shown) of the third bore section 868, has a fourth diameter 878 (not shown), that is greater than the first diameter 860 and the third diameter 872. In this exemplary implementation of the tenth embodiment, the second bore section 862 and the fourth bore section 874 have arcuate sidewalls.

The ninth embodiment of the bit cartridge 720 comprises a generally flat bit tip insert 760, a steel or tungsten carbide member 762, a tungsten carbide or hardened steel pin 764, and a straight annular retainer 756. The bit tip insert 750 comprises a base 758 and a tip 760 adjacent the base 758 that includes a curved section below an apex of the bit tip insert 750. This tip 760 can have a frustoconical shape, a flat generally cylindrical puck shape, a parabolic ballistic shape, a conical shape, and/or an arcuate shape. In this ninth embodiment, the base 758 includes a generally cylindrical sidewall 762 and a flat distal end 766 of the bit tip insert 650. In alternate embodiments, the base 758 can include a tapered sidewall (not shown) adjacent the flat distal end 766 of the bit tip insert 750, the base 758 can include a generally cylindrical sidewall 762, a planar distal end 766 and a frustoconical portion (not shown), and the base 758 can include a tapered sidewall (not shown), a planar distal end 766 and a frustoconical portion (not shown). In one exemplary implementation of the ninth embodiment, the bit tip insert 750 can have a diameter in the range of ⅝ inch to 1¼ inches. The bit tip insert 750 includes a diamond table overlay 768 of a polycrystalline diamond structure that is applied to an outer surface of the tip 684. The interface 770 of the overlay 768 adjacent the outer surface of the tip 760 may have a planar, slightly convex, or slightly concave shape. The overlay 768 may be a single coating or outer layer or multiple coatings or outer layers of such industrial diamond material, natural diamond, polycrystalline diamond (PCD) material, and polycrystalline diamond composite or PCD material.

The member 752 comprises an outer diameter 772 that is approximately the same diameter as, in this exemplary implementation, an upper outer diameter 774 of the bit tip insert 750 and comprises a generally cylindrical first bore 776 that axially extends inwardly from a forward end 778 of the member 752 to a first bore termination 780, which provides a space for receiving the complementary shaped sidewall 762 and frustoconical portion 764 of the base 758 of the bit tip insert 750. The diameter 772 of the member 752 is machined to a finished size before or after the bit tip insert 750 is brazed into the first bore 776 of the member 752. The remaining wall of the member 752 adjacent the inner portion 80 of the tungsten carbide ring 60 will wear away in use, causing the top portion of the sidewall 762 of the tungsten carbide base 758 of the bit tip insert 750 to contact and be supported by the dowel pin 754 and the generally cylindrical or tapered (not shown) top inner portion 80 of the tungsten carbide ring 60.

The member 752 further comprises a generally cylindrical second bore 782 that axially extends inwardly from a distal end 784 of the member 752 through an annular groove 786 of the member 752 adjacent a distal end 788 of the member 752 to a second bore termination 790. The second bore 782 provides a space for receiving a forward end 792 of the dowel pin 754, which may be press fitted into the second bore 782. The annular groove 786 of the member 752 includes a smaller diameter than the rest of the member 752 and is configured to receive the retainer 756.

To assemble the rotatable bit cartridge 720, the member 752 is manufactured and the base 758 of the bit tip insert 750 is brazed in the first bore 776 of the member 752 creating a high strength braze joint, which may then be optionally hardened before of after brazing the bit tip insert 750 in the first bore 776. The forward end 792 of the pin 754 is then pressed into the second bore 782 of the member 752 and the retainer 756 is assembled around the annular groove 786 of the member 752. Optionally, a lubricating agent, such as graphite powder, graphene, granular lubricating powder, or the equivalent of any of the foregoing, is added to all components of the rotatable bit cartridge 720, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 in a separate brazing step, operation, or process. The bit holder 852 may then be heat treated. Alternatively, the bit holder 852 may be heat treated and the body 16 machined, if necessary, to accept the ring 60, and then the ring 60 is positioned around the forward extension 66 and brazed in the annular trough 64 of the bit holder body 16 in a separate brazing step, operation, or process. To assemble the unitary bit/holder 14 comprising the ninth embodiment of the rotatable bit cartridge 720 and the tenth embodiment of the bit holder 852, a tungsten carbide or hardened steel bushing 794 is assembled into the third bore section 868 of bore 854, such that the distal end 796 of the bushing 794 contacts the bore termination 856 and the assembled rotatable bit cartridge 720 is inserted into the bore 854 of the forward extension 66 of the bit holder body 16. The bit cartridge 720 is rotatable throughout within the unitary bit/holder 14 after insertion into the bit holder 852. The dowel pin 754 radially aligns the bit cartridge 720, supports radial loading, improves bit cartridge rotation, extends axial length of bearing support, and allows the bit cartridge 720 body to be used whether the rotatable bit cartridge 720 was heat treated or not heat treated.

Figure 19:
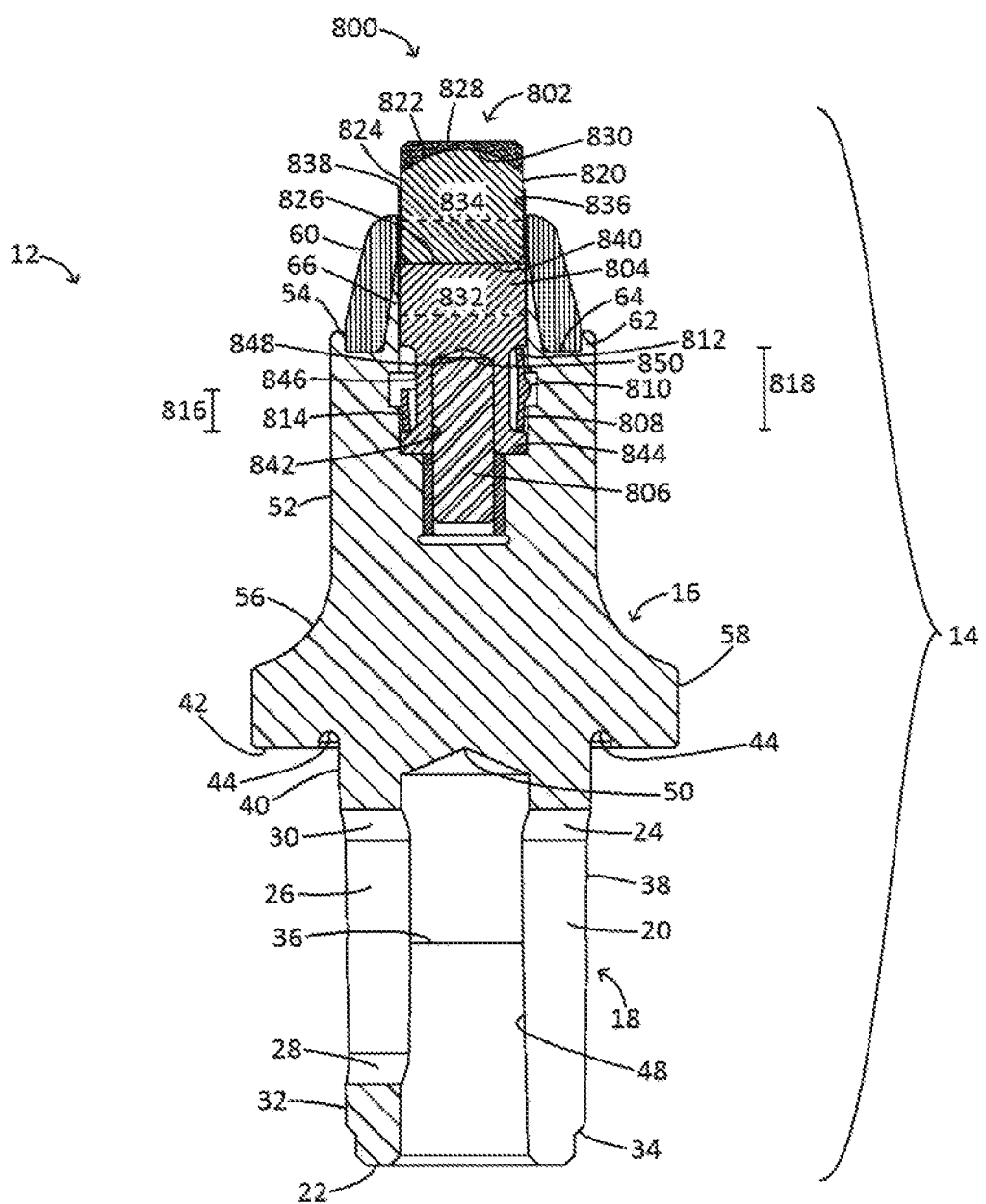
FIG. 19 is a cross-sectional view of the first embodiment of the unitary bit/holder and a tenth embodiment of a rotatable bit cartridge assembled in the unitary bit/holder in accordance with implementations of this disclosure.

Referring to FIGS. 19 and 24, a tenth embodiment of a rotatable bit cartridge 800 (FIG. 19) is shown in the first embodiment of the bit holder 12 (FIGS. 19 and 24) of the present disclosure. The tenth embodiment of the bit cartridge 800 comprises a generally flat bit tip insert 802, a steel or tungsten carbide member 804, a tungsten carbide or hardened steel pin 806, and dimpled annular retainer 808 that includes at least one dimple 810 on an outer surface of sidewall 812 of the retainer 808. The annular sidewall 812 comprises a shortened portion 814 that has an axial length 816 that is less than an axial length 818 of the sidewall 812. The bit tip insert 802 comprises a base 820 and a tip 822 adjacent the base 820 that includes a curved section below an apex of the bit tip insert 802. This tip 822 can have a frustoconical shape, a flat generally cylindrical puck shape, a parabolic ballistic shape, a conical shape, and/or an arcuate shape. In this tenth embodiment, the base 820 includes a generally cylindrical sidewall 824 and a flat distal end 826 of the bit tip insert 802. In alternate embodiments, the base 820 can include a tapered sidewall (not shown) adjacent the flat distal end 826 of the bit tip insert 802, the base 820 can include a generally cylindrical sidewall 824, a planar distal end 826 and a frustoconical portion (not shown), and the base 820 can include a tapered sidewall (not shown), a planar distal end 826 and a frustoconical portion (not shown). In one exemplary implementation of the tenth embodiment, the bit tip insert 802 can have a diameter in the range of ⅝ inch to 1¼ inches. The bit tip insert 802 includes a diamond table overlay 828 of a polycrystalline diamond structure that is applied to an outer surface of the tip 822. An interface 830 of the overlay 828 adjacent the outer surface of the tip 822 may have a planar, slightly convex, or slightly concave shape. The overlay 828 may be a single coating or outer layer or multiple coatings or outer layers of such industrial diamond material, natural diamond, polycrystalline diamond (PCD) material, and polycrystalline diamond composite or PCD material.

The member 804 comprises an outer diameter 832 that is approximately the same diameter as, in this exemplary implementation, an upper outer diameter 834 of the bit tip insert 802 and comprises a generally cylindrical first bore 836 that axially extends inwardly from a forward end 838 of the member 804 to a first bore termination 840, which provides a space for receiving the complementary shaped sidewall 824 of the bit tip insert 802 and the distal end 826 of the base 820 of the bit tip insert 802. The diameter 832 of the member 804 is machined to a finished size before or after the bit tip insert 802 is brazed into the first bore 836 of the member 804. The remaining wall of the member 804 adjacent the inner portion 80 of the tungsten carbide ring 60 will wear away in use, causing the top portion of the sidewall 824 of the tungsten carbide base 820 of the bit tip insert 802 to contact and be supported by the dowel pin 806 and the generally cylindrical or tapered (not shown) top inner portion 80 of the tungsten carbide ring 60.

The member 804 further comprises a generally cylindrical second bore 842 that axially extends inwardly from a distal end 844 of the member 804 through an annular groove 846 of the member 804 adjacent the distal end 844 of the member 804 to a second bore termination 848. The second bore 842 provides a space for receiving a forward end 850 of the dowel pin 806, which may be press fitted into the second bore 842. The annular groove 846 of the member 804 includes a smaller diameter than the rest of the member 804 and is configured to receive the retainer 808.

To assemble the rotatable bit cartridge 800, the member 804 is manufactured and the base 820 of the bit tip insert 802 is brazed in the first bore 836 of the member 804 creating a high strength braze joint, which may then be optionally hardened before or after brazing the bit tip insert 802 in the first bore 836. The forward end 850 of the pin 806 is then pressed into the second bore 842 of the member 804 and the retainer 808 is assembled around the annular groove 846 of the member 804. Optionally, a lubricating agent, such as graphite powder, graphene, granular lubricating powder, or the equivalent of any of the foregoing, is added to all components of the rotatable bit cartridge 800, including all rotary bit cartridge bore cavities. An excessive amount of graphite powder, for example, may be added during the assembly process and is adapted to provide lubrication to all moving components, to allow the excess graphite powder to act as a seal to exclude cut material from entering the assembly providing a cutting fines exclusion barrier, and to allow the graphite powder to act as a heat transfer carrier that transfers heat away from the bit tip profile. The annular tungsten carbide ring 60 is positioned around the forward extension 66 and brazed in the annular trough 64 of the bit holder body 16 in a separate brazing step, operation, or process. The bit holder 852 may then be heat treated. Alternatively, the bit holder 852 may be heat treated and the body 16 machined, if necessary, to accept the ring 60, and then the ring 60 is positioned around the forward extension 66 and brazed in the annular trough 64 of the bit holder body 16 in a separate brazing step, operation, or process. To assemble the unitary bit/holder 14 comprising the ninth embodiment of the rotatable bit cartridge 800 and the tenth embodiment of the bit holder 852, a tungsten carbide or hardened steel bushing 154 is assembled into the fourth bore section 874 of bore 854 and the assembled rotatable bit cartridge 800 is inserted into the bore 854 of the forward extension 66 of the bit holder body 16. The bit cartridge 800 is rotatable throughout within the unitary bit/holder 14 after insertion into the bit holder 12. The dowel pin 806 radially aligns the bit cartridge 800, supports radial loading, improves bit cartridge rotation, extends axial length of bearing support, and allows the bit cartridge 800 body to be used whether the rotatable bit cartridge 720 was heat treated or not heat treated.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, "X includes at least one of A and B" is intended to mean any of the natural inclusive permutations. That is, if X includes A; X includes B; or X includes both A and B, then "X includes at least one of A and B" is satisfied under any of the foregoing instances. The articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect or implementation unless described as such.

While the present disclosure has been described in connection with certain embodiments and measurements, it is to be understood that the present disclosure is not to be limited to the disclosed embodiments and measurements but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A rotatable bit comprising:
   a body comprising a one of a generally cylindrical and a tapered first bore extending axially inwardly from a forward end of the body;
   a bit tip insert comprising a tip and a base subjacent the tip, a portion of the base adjacent a distal end of the bit tip insert disposed within the first bore of the body;
   an annular groove disposed circumferentially around an outer surface of the body adjacent a distal end of the body, the annular groove including an outer diameter less than an outer diameter of the body; and
   a retainer disposed circumferentially around the annular groove of the body, the retainer rotatable about a longitudinal axis of the body, the retainer comprising one of a dimpled sidewall including at least one dimple on an outer surface of the dimpled sidewall and a straight sidewall, the dimpled sidewall and the straight sidewall comprising one of a constant axial length and a variable axial length.

2. The rotatable bit of claim 1, further comprising:
   one of a flat and frustoconical first bore termination of the first bore, the first bore termination complementarily shaped to the distal end of the bit tip insert, the distal end of the bit tip insert comprising one of a flat portion and a frustoconical portion.

3. The rotatable bit of claim 1, further comprising:
   one of a tapered sidewall and a cylindrical sidewall of the base of the bit tip insert.

4. The rotatable bit of claim 1, wherein the body comprises one of steel and tungsten carbide.

5. The rotatable bit of claim 1, further comprising:
   a diamond table overlay applied to an outer surface of the tip of the bit tip insert, the diamond table overlay comprising an interface adjacent the outer surface of the tip, the interface comprising at least one of a planar, slightly convex, and slightly concave shape.

6. The rotatable bit of claim 5, wherein the diamond table overlay comprises at least one of a:
   single coating of at least one of industrial diamond material, natural diamond, polycrystalline diamond (PCD) material, and polycrystalline diamond composite or PCD material;
   single outer layer of at least one of industrial diamond material, natural diamond, polycrystalline diamond (PCD) material, and polycrystalline diamond composite or PCD material;
   multiple coatings of at least one of industrial diamond material, natural diamond, polycrystalline diamond (PCD) material, and polycrystalline diamond composite or PCD material; and
   multiple layers of at least one of industrial diamond material, natural diamond, polycrystalline diamond (PCD) material, and polycrystalline diamond composite or PCD material.

7. The rotatable bit of claim 1, further comprising:
   a flat planar surface at a distal end of the body.

8. The rotatable bit of claim 1, further comprising:
   a lubricating agent.

9. A rotatable bit comprising:
   a body comprising a one of a generally cylindrical and a tapered first bore extending axially inwardly from a forward end of the body;
   a bit tip insert comprising a tip and a base subjacent the tip, a portion of the base adjacent a distal end of the bit tip insert disposed within the first bore of the body;
   a second bore extending axially inwardly from a distal end of the body; and
   at least one of a pin comprising a forward end disposed within the second bore of the body and a magnet disposed within the second bore of the body.

10. The rotatable bit of claim 9, further comprising:
    one of a flat second bore termination, a conical second bore termination, and frustoconical second bore termination of the second bore.

11. The rotatable bit of claim 9, wherein the pin comprises one of steel and tungsten carbide.

12. A bit holder comprising:
    a body comprising a first bore extending inwardly from a forward end of the body, the first bore comprising a plurality of sections;
    a shank axially depending from a bottom of the body;
    a forward extension subjacent the forward end of the body, the first bore axially extending from the forward end of the body through the forward extension;
    an annular trough laterally extending from a distal end of the forward extension; and
    an annular ring disposed around the forward extension and seated in the annular trough of the body.

13. The bit holder of claim 12, wherein the annular ring comprises tungsten carbide.

14. The bit holder of claim 12, further comprising:
    a first bore termination disposed below the forward extension within the body.

15. The bit holder of claim 12, further comprising:
    a bushing disposed within a first section of the first bore, the first section adjacent the first bore termination.

16. The bit holder of claim 15, further comprising:
    a rotatable bit comprising a bit body disposed within the first bore of the body.

17. The bit holder of claim 16, the rotatable bit further comprising:
    the bit body comprising one of a generally cylindrical and a tapered first bit bore extending axially inwardly from a forward end of the bit body;
    a bit tip insert comprising a tip and a base subjacent the tip, a portion of the base adjacent a distal end of the bit tip insert disposed within the first bit bore of the bit body;
    an annular groove disposed circumferentially around an outer surface of the bit body adjacent a distal end of the bit body, the annular groove including an outer diameter less than an outer diameter of the bit body;
    a retainer comprising one of a dimpled sidewall and an arcuate sidewall, the dimpled sidewall including at least one dimple on an outer surface of the dimpled sidewall, one of the dimpled sidewall and the arcuate sidewall comprising one of one axial length and at least two axial lengths, the retainer disposed circumferentially around the annular groove of the bit body, the retainer rotatable about a longitudinal axis of the bit body;
    a second bit bore extending axially inwardly from a distal end of the bit body; and
    a pin comprising a forward end disposed within the second bit bore of the bit body; and
    a distal end of the pin of the rotatable bit disposed within the bushing in the first section of the first bore;
    a lower portion of the distal end of the bit body and a distal end of the retainer disposed within the a second section of the first bore adjacent the first section of the bore, a distal end of the second section of the first bore comprising a relief zone including a diameter larger than a diameter of the second section;
one of the dimpled sidewall and the arcuate sidewall of the retainer disposed within a third section of the first bore adjacent the second section of the first bore; and
a forward end of the retainer and the forward end of the bit body disposed within a fourth section of the first bore adjacent the third section of the first bore, the rotatable bit adapted to rotate within the first bore of the body of the bit holder.

18. The bit holder of claim 16, the rotatable bit further comprising:
the bit body comprising one of a generally cylindrical and a tapered first bit bore extending axially inwardly from a forward end of the bit body;
a bit tip insert comprising a tip and a base subjacent the tip, a portion of the base adjacent a distal end of the bit tip insert disposed within the first bit bore of the bit body;
an annular groove disposed circumferentially around an outer surface of the bit body adjacent a distal end of the bit body, the annular groove including an outer diameter less than an outer diameter of the bit body;
a retainer comprising a straight sidewall, the retainer disposed circumferentially around the annular groove of the bit body, the retainer rotatable about a longitudinal axis of the bit body;
a second bit bore extending axially inwardly from a distal end of the bit body; and
a pin comprising a forward end disposed within the second bit bore of the bit body;
a distal end of the pin of the rotatable bit disposed within the bushing in the first section of the first bore;
the bit body and the retainer disposed within the a second section of the first bore adjacent the first section of the bore, a distal end of the second section of the first bore comprising a relief zone including a diameter larger than a diameter of the second section, the rotatable bit adapted to rotate within the first bore of the body of the bit holder.

19. The rotatable bit of claim 18, wherein the lubricating agent comprises at least one of graphite powder, graphene, and granular lubricating powder.

20. The bit holder of claim 16, wherein the rotatable bit further comprises a lubricating agent.

21. The bit holder of claim 20, wherein the lubricating agent comprises at least one of graphite powder, graphene, and granular lubricating powder.

22. The bit holder of claim 12, further comprising:
a rotatable bit comprising a bit body disposed within the first bore of the body.

23. The bit holder of claim 22, the rotatable bit further comprising:
the bit body comprising a one of a generally cylindrical and a tapered first bit bore extending axially inwardly from a forward end of the bit body;
a bit tip insert comprising a tip and a base subjacent the tip, a portion of the base adjacent a distal end of the bit tip insert disposed within the first bit bore of the bit body;
an annular groove disposed circumferentially around an outer surface of the bit body adjacent a distal end of the bit body, the annular groove including an outer diameter less than an outer diameter of the bit body;
a retainer comprising a dimpled sidewall including at least one dimple on an outer surface of the dimpled sidewall, the retainer disposed circumferentially around the annular groove of the bit body, the retainer rotatable about a longitudinal axis of the bit body;
a second bit bore extending axially inwardly from a distal end of the bit body; and
a pin comprising a forward end disposed within the second bit bore of the bit body.

24. The bit holder of claim 23, further comprising:
a distal end of the pin of the rotatable bit disposed within the bushing in the first section of the first bore;
the distal end of the bit body and a distal end of the retainer disposed within a second section of the first bore adjacent the first section of the first bore;
the dimpled sidewall of the retainer disposed within a third section of the first bore adjacent the second section of the first bore; and
a forward end of the retainer and the forward end of the bit body disposed within a fourth section of the first bore adjacent the third section of the first bore, the rotatable bit adapted to be rotatable throughout within the first bore of the body of the bit holder.

25. The bit holder of claim 22, the rotatable bit further comprising:
the bit body comprising a one of a generally cylindrical and a tapered first bit bore extending axially inwardly from a forward end of the bit body;
a bit tip insert comprising a tip and a base subjacent the tip, a portion of the base adjacent a distal end of the bit tip insert disposed within the first bit bore of the bit body;
an annular groove disposed circumferentially around an outer surface of the bit body adjacent a distal end of the bit body, the annular groove including an outer diameter less than an outer diameter of the bit body;
a retainer comprising one of an arcuate sidewall and a straight sidewall, the retainer disposed circumferentially around the annular groove of the bit body, the retainer rotatable about a longitudinal axis of the bit body;
a second bit bore extending axially inwardly from a distal end of the bit body; and
a pin comprising a forward end disposed within the second bit bore of the bit body.

26. The bit holder of claim 25, further comprising:
a distal end of the pin of the rotatable bit axially extending through the bushing in the first section of the first bore to the arcuate bore portion; and
the bit body and the retainer disposed within a second section of the first bore adjacent the first section of the first bore, the rotatable bit adapted to be rotatable throughout within the first bore of the body of the bit holder.

27. The bit holder of claim 22, the rotatable bit further comprising:
the bit body comprising a one of a generally cylindrical and a tapered first bit bore extending axially inwardly from a forward end of the bit body;
a bit tip insert comprising a tip and a base subjacent the tip, a portion of the base adjacent a distal end of the bit tip insert disposed within the first bit bore of the bit body;
an annular groove disposed circumferentially around an outer surface of the bit body adjacent a distal end of the bit body, the annular groove including an outer diameter less than an outer diameter of the bit body;
a retainer comprising a dimpled sidewall including at least one dimple on an outer surface of the dimpled sidewall, the sidewall comprising at least two axial lengths, the retainer disposed circumferentially around the annular groove of the bit body, the retainer rotatable about a longitudinal axis of the bit body;

a second bit bore extending axially inwardly from a distal end of the bit body; and a pin comprising a forward end disposed within the second bit bore of the bit body.

28. The bit holder of claim 27, further comprising:
a distal end of the pin of the rotatable bit disposed within the bushing in the first section of the first bore;
the distal end of the bit body and a distal end of the retainer disposed within a second section of the first bore adjacent the first section of the first bore;
the dimpled sidewall of the retainer disposed within a third section of the first bore adjacent the second section of the first bore; and
a forward end of the retainer and the forward end of the bit body disposed within a fourth section of the first bore adjacent the third section of the first bore, the rotatable bit adapted to be rotatable throughout within the first bore of the body of the bit holder.

29. The bit holder of claim 12, further comprising:
a second bore axially extending from the arcuate bore portion to a third bore that axially extends to a distal end of the shank, the third bore comprising a larger diameter than the second bore.

30. The bit holder of claim 22, the rotatable bit further comprising:
the bit body comprising one of a generally cylindrical and a tapered first bit bore extending axially inwardly from a forward end of the bit body;
a bit tip insert comprising a tip and a base subjacent the tip, a portion of the base adjacent a distal end of the bit tip insert disposed within the first bit bore of the bit body;
an annular groove disposed circumferentially around an outer surface of the bit body adjacent a distal end of the bit body, the annular groove including an outer diameter less than an outer diameter of the bit body;
a retainer comprising one of a dimpled sidewall including at least one dimple on an outer surface of the dimpled sidewall and a straight sidewall, the retainer disposed circumferentially around the annular groove of the bit body, the retainer rotatable about a longitudinal axis of the bit body;
a second bit bore extending axially inwardly from a distal end of the bit body; and
a pin comprising a forward end disposed within the second bit bore of the bit body.

31. The bit holder of claim 30, further comprising:
a distal end of the pin of the rotatable bit disposed within the bushing in the first section of the first bore;
a lower portion of the distal end of the bit body disposed within the first section of the first bore;
an upper portion of the distal end of the bit body and a distal end of the retainer disposed within a second section of the first bore adjacent the first section of the first bore;
the sidewall of the retainer disposed within a third section of the first bore adjacent the second section of the first bore; and
a forward end of the retainer and the forward end of the bit body disposed within a fourth section of the first bore adjacent the third section of the first bore, the rotatable bit adapted to rotated within the first bore of the body of the bit holder.

32. The bit holder of claim 15, further comprising:
a magnet disposed within a first section of the first bore, the first section subjacent an arcuate bore portion; and
a bushing disposed within a second section of the first bore, the second section adjacent the arcuate bore portion.

33. The bit holder of claim 32, further comprising:
a rotatable bit comprising a bit body disposed within the first bore of the body.

34. The bit holder of claim 33, the rotatable bit further comprising:
the bit body comprising a one of a generally cylindrical and a tapered first bit bore extending axially inwardly from a forward end of the bit body;
a bit tip insert comprising a tip and a base subjacent the tip, a portion of the base adjacent a distal end of the bit tip insert disposed within the first bit bore of the bit body;
a second bit bore extending axially inwardly from a distal end of the bit body; and
a pin comprising a forward end disposed within the second bit bore of the bit body.

35. The bit holder of claim 34, further comprising:
a distal end of the pin of the rotatable bit axially extending through the bushing in the second section of the first bore to the arcuate bore portion; and
a distal portion of the bit body disposed within a third section of the first bore adjacent the second section of the first bore, the rotatable bit adapted to rotated within the first bore of the body of the bit holder.

36. The bit holder of claim 33, wherein the rotatable bit further comprises a lubricating agent.

37. The bit holder of claim 36, wherein the lubricating agent comprises at least one of graphite powder, graphene, and granular lubricating powder.

38. The bit holder of claim 22, the rotatable bit further comprising:
the bit body comprising one of a generally cylindrical and a tapered first bit bore extending axially inwardly from a forward end of the bit body;
a bit tip insert comprising a tip and a base subjacent the tip, a portion of the base adjacent a distal end of the bit tip insert disposed within the first bit bore of the bit body;
an annular groove disposed circumferentially around an outer surface of the bit body adjacent a distal end of the bit body, the annular groove including an outer diameter less than an outer diameter of the bit body;
a retainer comprising one of a dimpled sidewall including at least one dimple on an outer surface of the dimpled sidewall and a straight sidewall, the retainer disposed circumferentially around the annular groove of the bit body, the retainer rotatable about a longitudinal axis of the bit body;
a second bit bore extending axially inwardly from a distal end of the bit body; and
a pin comprising a forward end disposed within the second bit bore of the bit body.

39. The bit holder of claim 38, further comprising:
a distal end of the pin of the rotatable bit disposed within a first section of the first bore;
a lower portion of the distal end of the bit body and a distal end of the retainer disposed within a second section of the first bore adjacent the first section of the first bore;

the sidewall of the retainer disposed within a third section of the first bore adjacent the second section of the first bore; and a forward end of the retainer and the forward end of the bit body disposed within a fourth section of the first bore adjacent the third section of the first bore, the rotatable bit adapted to rotate within the first bore of the body of the bit holder.

40. The bit holder of claim 12, further comprising:
a first magnet disposed within a first section of the first bore, the first section subjacent an arcuate bore portion of the first bore.

41. The bit holder of claim 40, further comprising:
a rotatable bit comprising:
  a bit body comprising a one of a generally cylindrical and a tapered first bit bore extending axially inwardly from a forward end of the bit body;
  a bit tip insert comprising a tip and a base subjacent the tip, a portion of the base adjacent a distal end of the bit tip insert disposed within the first bit bore of the bit body;
  a second bit bore extending axially inwardly from a distal end of the bit body; and
  a second magnet disposed within the second bit bore of the bit body; and
a distal end of the second magnet of the rotatable bit adjacent the first magnet when a distal portion of the bit body is disposed within a second section of the first bore adjacent the first section of the first bore, the rotatable bit adapted to rotated within the first bore of the body of the bit holder.

42. The bit holder of claim 41, wherein the rotatable bit further comprises a lubricating agent.

43. The bit holder of claim 42, wherein the lubricating agent comprises at least one of graphite powder, graphene, and granular lubricating powder.

44. The bit holder of claim 22, wherein the rotatable bit further comprises a lubricating agent.

45. The bit holder of claim 44, wherein the lubricating agent comprises at least one of graphite powder, graphene, and granular lubricating powder.

46. The bit holder of claim 12, further comprising:
a rotatable bit comprising:
  a bit body comprising one of a generally cylindrical and a tapered first bit bore extending axially inwardly from a forward end of the bit body;
  a bit tip insert comprising a tip and a base subjacent the tip, a portion of the base adjacent a distal end of the bit tip insert disposed within the first bit bore of the bit body;
  an annular groove disposed circumferentially around an outer surface of the bit body adjacent a distal end of the bit body, the annular groove including an outer diameter less than an outer diameter of the bit body; and
  a retainer comprising one of a dimpled sidewall including at least one dimple on an outer surface of the dimpled sidewall and a straight sidewall, the retainer disposed circumferentially around the annular groove of the bit body, the retainer rotatable about a longitudinal axis of the bit body; and
a lower portion of the distal end of the bit body and a distal end of the retainer disposed within a first section of the first bore;
the sidewall of the retainer disposed within a second section of the first bore adjacent the first section of the first bore; and
a forward end of the retainer and the forward end of the bit body disposed within a third section of the first bore adjacent the second section of the first bore, the rotatable bit adapted to be rotatable throughout within the first bore of the body of the bit holder.

47. The bit holder of claim 46, wherein the rotatable bit further comprises a lubricating agent.

48. The bit holder of claim 47, wherein the lubricating agent comprises at least one of graphite powder, graphene, and granular lubricating powder.

* * * * *